US010434653B2

United States Patent
Yang et al.

(10) Patent No.: US 10,434,653 B2
(45) Date of Patent: Oct. 8, 2019

(54) MOVEMENT MAPPING BASED CONTROL OF TELEROBOT

(71) Applicant: Intel Corporation, Santa Clara, CA (US)

(72) Inventors: Sirui Yang, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 15/518,469

(22) PCT Filed: May 11, 2016

(86) PCT No.: PCT/CN2016/081674
§ 371 (c)(1),
(2) Date: Apr. 11, 2017

(87) PCT Pub. No.: WO2017/193297
PCT Pub. Date: Nov. 16, 2017

(65) Prior Publication Data
US 2018/0200889 A1    Jul. 19, 2018

(51) Int. Cl.
*B25J 9/16* (2006.01)
*B25J 13/02* (2006.01)
(Continued)

(52) U.S. Cl.
CPC .......... *B25J 9/1689* (2013.01); *B25J 9/1697* (2013.01); *B25J 13/025* (2013.01); *G06F 3/011* (2013.01);
(Continued)

(58) Field of Classification Search
CPC ...... B25J 9/1689; B25J 9/1697; B25J 13/025; G06F 3/011; G06F 2203/012; G06T 19/00; G05B 2219/40174
See application file for complete search history.

(56) References Cited

U.S. PATENT DOCUMENTS 9,183,676 B2    11/2015 McCulloch et al.
2007/0096674 A1*    5/2007 Hashimoto ............ B25J 9/1674
318/568.13
(Continued)

FOREIGN PATENT DOCUMENTS

CN    104750249 A    7/2015
CN    104937519 A    9/2015
(Continued)

OTHER PUBLICATIONS

International Search Report and Written Opinion dated Feb. 28, 2017 for International Application No. PCT/CN2016/081674, 12 pages.
(Continued)

*Primary Examiner* — Robert T Nguyen
(74) *Attorney, Agent, or Firm* — Schwabe, Williamson & Wyatt, P.C.

(57) ABSTRACT

Movement of a user in a user space is mapped to a first portion of a command action stream sent to a telerobot in a telerobot space. An immersive feedback stream is provided by the telerobot to the user. Upon movement of user into or proximate to a margin of user space, the first portion of the command action stream may be suspended. The user may re-orient in the user space, and may then continue to move, with movement mapping re-engaged and resumption of transmission of a second portion of command action stream. In this way, user may control a telerobot via movement mapping, even though user space and telerobot space may not be the same size.

16 Claims, 13 Drawing Sheets

(51) Int. Cl.
*G06F 3/01* (2006.01)
*G06T 19/00* (2011.01)
(52) U.S. Cl.
CPC .... *G06T 19/00* (2013.01); *G05B 2219/40174* (2013.01); *G06F 2203/012* (2013.01)

(56) References Cited

U.S. PATENT DOCUMENTS

| | | | |
|---|---|---|---|
| 2011/0009241 A1* | 1/2011 | Lane | A63B 24/0087 482/8 |
| 2015/0049004 A1* | 2/2015 | Deering | G02B 27/0172 345/8 |
| 2015/0138301 A1 | 6/2015 | Kim et al. | |
| 2016/0225188 A1* | 8/2016 | Ruddell | G06T 19/006 |
| 2017/0205892 A1* | 7/2017 | Petrovskaya | G06T 19/006 |
| 2018/0129276 A1* | 5/2018 | Nguyen | G09B 19/00 |
| 2018/0239309 A1* | 8/2018 | Tamura | G05B 19/0426 |

FOREIGN PATENT DOCUMENTS

| | | |
|---|---|---|
| CN | 105074617 A | 11/2015 |
| GB | 2524269 A | 9/2015 |

OTHER PUBLICATIONS

Corrected International Search Report dated Mar. 28, 2017 for International Application No. PCT/CN2016/081674, 5 pages.

* cited by examiner

MOVEMENT MAPPING BASED CONTROL OF TELEROBOT

CROSS REFERENCE TO RELATED APPLICATIONS

The present application is a national phase entry under 35 U.S.C. § 371 of International Application No. PCT/CN2016/081674, filed May 11, 2016, entitled "MOVEMENT MAPPING BASED CONTROL OF TELEROBOT", which designated, among the various States, the United States of America. The Specifications of the PCT/CN2016/081674 Application is hereby incorporated by reference.

TECHNICAL FIELD

The present disclosure relates to the field of computing and, more specifically, telerobotics and operation of a machine at a distance via movement mapping of the operator.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In computing, telerobotics is an area of robotics concerned with the control of semi-autonomous robots from a distance. As used herein, a "robot" is a computer-controlled machine controlled relatively indirectly, such as by being programmed. As used herein, a "telerobot" refers to a computer controlled machine which is controlled remotely by a human operator. Another term for "telerobot" is "telemanipulator".

Remote human control can involve direct correspondence between a human operator's command actions and the actions of the telerobot, such as a radio-controlled model aircraft in which the engine, flaps, and rudder are controlled directly by a human operator in real time. Remote human control can also be indirect, such as when the telerobot comprises logic to control engine, flaps, and rudder and the human controller's input is interpreted as a change in speed and/or direction and a rate at which the telerobot will implement the change in speed and/or direction. The human operator's command actions can be communicated in essentially real time, that is to say, with a latency of less than one-quarter of a second, or not in real time (with a latency of greater than one-quarter second).

As used herein, an "avatar" is a graphical representation of a person, animal, or physical object in a virtual world, such as a computer game or computer generated 3-dimensional space, wherein the graphical representation is controlled by a living human, animal, or other organism (collectively referred to herein as an "operator" or "human operator").

When an operator is controlling a telerobot in the real world or an avatar in a digital space, feedback from the telerobot or avatar is typically available or provided to the operator. Feedback may be through direct observation by the operator (as may be the case with a radio-controlled aircraft) or by transmitting sensor data from the telerobot to the operator. Examples of sensor data include video (images and audio), attitude (roll, pitch, and yaw), speed, and the like. The sensor data may be decoded or otherwise converted into output which the operator can perceive. For example, decoded (or analog) video and decoded attitude data may be output to a video on a screen viewable by the operator, attitude data may be decoded and output to a graphical representation of attitude indicators on a video screen or to a joystick held by the human operator as haptic feedback. In the case of an avatar, the feedback may be provided in similar ways, though with a first step of generating the sensor data, such as generating video from a point of view within a computer generated 3-dimensional space.

The feedback provided to the operator may be "immersive", in that it replaces some or all of the sensory experiences of the operator, such as with a virtual reality headset which displays images (including video), provides stereo audio, and/or haptic feedback derived from data obtained by sensors in, available, or proximate to the telerobot; this shall be referred to herein as "immersive feedback".

With respect to both telerobots and avatars, the operator's control commands may be interpreted from real world movements of the operator or even from detecting activity of the operator's nervous system. In the simple case of the radio-controlled aircraft, a human operator may control one or two joy sticks, wheels, pedals, buttons, or the like in a controller. The human operator's movements of these components in the controller produces electrical signals which are (typically processed and) then transmitted to the remote aircraft. An operator's movements may also be observed—for example, by a video camera, by movement of a sensor-bearing "wand" or the like—interpreted as control commands, encoded, and then transmitted to the remote telerobot or avatar. This shall be referred to herein as "movement mapping based control".

When movement mapping based control is provided between an operator and a telerobot or avatar, and when the telerobot or avatar provides immersive auditory, visual, or haptic feedback to the operator ("immersive feedback"), problems can occur when there is a difference between the real space occupied by the operator and the real or virtual space occupied by the telerobot or avatar. For example, if the operator is wearing a virtual reality headset displaying immersive feedback, such as video recorded by a telerobot, and if movement mapping based control is used to control the telerobot, the immersive feedback may cause the operator to experience dizziness or confusion or the operator may not be able to properly control the telerobot if the real space navigated by the operator and the telerobot do not align.

BRIEF DESCRIPTION OF THE DRAWINGS

Embodiments of the movement mapping based telepresence interaction techniques of the present disclosure may overcome some or all of the above noted limitations. The technique will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
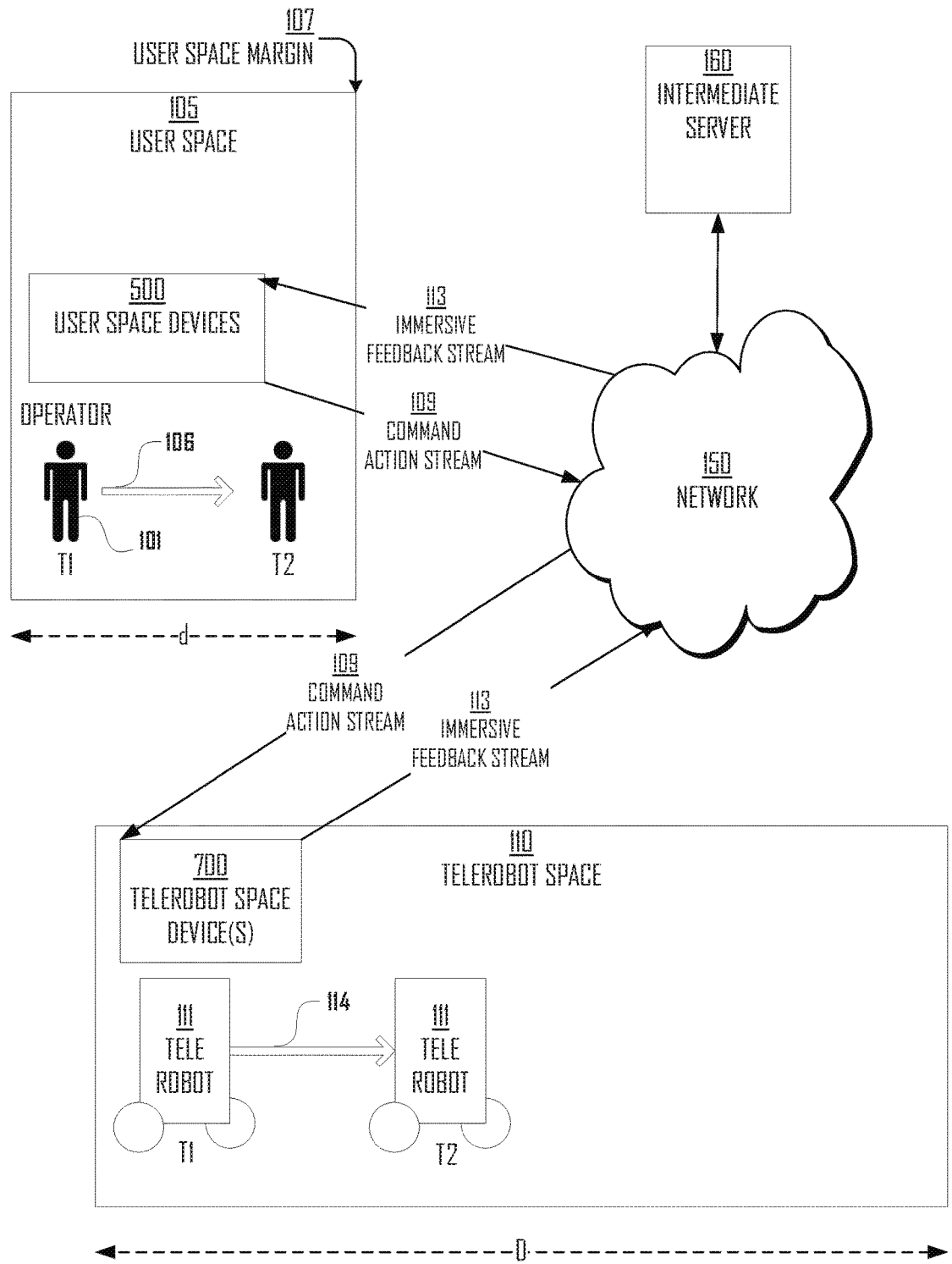
FIG. 1 is a network and device diagram illustrating a first view of exemplary networks and computer devices configured according to the present disclosure, deployed in physical spaces, and in which a user controls a remote telerobot via motion.

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein", "above", "below" and words of similar import, when used in this application, shall refer to this application as a whole and not to particular portions of this application. When the context permits, words in the above Detailed Description using the singular may also include the plural while words using the plural may also include the singular. The word "or," in reference to a list of two or more items, covers all of the following interpretations of the word: any of the items in the list, all of the items in the list, and any combination of one or more of the items in the list.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "at least one of A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), a System on a Chip (SoC), an electronic circuit, a processor (shared, dedicated, or group) and/or memory (shared, dedicated, or group) that execute one or more software or firmware programs, a combinational logic circuit, and/or other suitable components that provide the described functionality.

In overview, described are apparatuses, methods and storage media associated with command actions by a user in a user space, a telerobot in a telerobot space, and an immersive feedback stream provided by the telerobot to the user.

Referring to FIG. 1, illustrated is a user, operator 101, in a user space 105. User space 105 may be, for example, a constructed or otherwise existing partially or fully enclosed space, such as a building, a room, an office, or an exterior space with at least a partial boundary, across which operator 101 cannot or should not pass. An example of a boundary is illustrated in FIG. 1, identified with the label "user space margin 107" (also referred to herein as a "margin"). An example of user space margin 107 is a wall in a room. User space margin 107 may completely or partially enclose user space 105. User space 105 is illustrated in FIG. 1 as having a length "d" along one axis.

In FIG. 1, operator 101 and user space device 500 may be paired with telerobot 111; operator 101 and telerobot 111 are generally speaking, remote from one another. Telerobot is illustrated as being within telerobot space 110. Telerobot space 110 is illustrated as having a length "D" along one axis. Lengths "d" and "D" are meant to be different.

Figure 4:
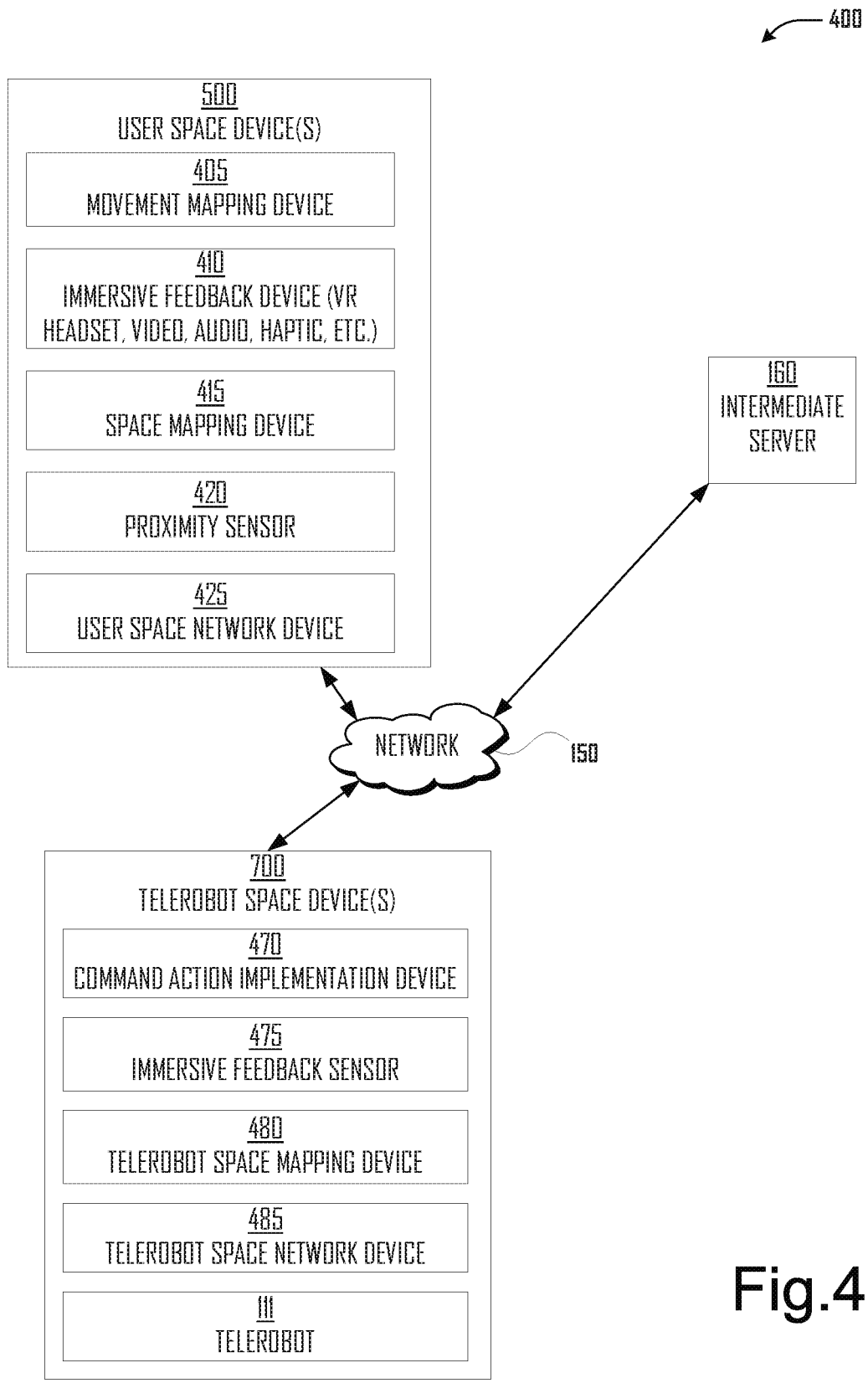
FIG. 4 is a network and device diagram illustrating exemplary networks and computer devices configured according to the present disclosure.

Also illustrated in FIG. 1 is user space device 500. User space device 500 is illustrated and discussed further herein in relation to FIG. 4. As illustrated in FIG. 4, user space device 500 may be several separate devices and/or one device incorporating several devices or the functions of several devices, such as a movement mapping device 405, an immersive feedback device 410, a space mapping device 415, a proximity sensor 420, and a user space network device 425. In one embodiment, user space device 500 may be, for example, an immersive feedback device 410 or virtual reality headset worn by operator 101, such as an OCULUS RIFT®, HTC VIVE™, PLAYSTATION VR®, SAMSUNG GEAR VR®, a FOVE™, and the like. As discussed further herein, the virtual reality headset (and/or another user space device 500) may provide immersive feedback from telerobot 111 to operator 101, for example, allowing operator 101 to experience video recorded by telerobot 111. Such an immersive feedback stream is illustrated at immersive feedback stream 113. The virtual reality headset or another user space device 500 may alternatively or also act as a movement mapping device 405. When acting as movement mapping device 405, it may execute, for example, movement mapping module 900 (FIG. 9) and convert the movements and explicit commands of operator 101 into a command action stream, command action stream 109, which is sent to telerobot 111 (and/or telerobot space device 700 (FIG. 7)), directing telerobot 111 to move within telerobot space 110.

For example, referring to FIG. 1, operator 101 in user space 105 is illustrated as moving from a first location at a first time, T1, to a second location at a second, subsequent, time, T2, along path 106. The virtual reality headset may, acting as movement mapping device 405 and executing movement mapping module 900, convert operator 101's movement along path 106 into command action stream 109 which is sent to telerobot 111 (and/or telerobot space device 700), causing telerobot 111 to move along path 114 in telerobot space 110. Paths 106 and 114 may or may not be the same distance.

As telerobot 111 moves along path 114 it continues to send immersive feedback stream 113 to operator 101 and/or user space device 500. If path 106 and path 114 are not the same length, operator 101 may experience dizziness or another uncomfortable, unsettling, disorienting disjunction between the (human) motor senses of operator 101 and the visual experience provided by the virtual reality headset. If path 106 and path 114 are the same length, operator 101's visual and motor senses may be more closely aligned; however, then operator 101 may reach user space margin 107 before telerobot 111 has reached a desired destination in telerobot space 110.

Also illustrated in FIG. 1 is telerobot space device 700. Telerobot space device 700 is illustrated and discussed further herein in relation to FIG. 4. As illustrated in FIG. 4, telerobot space device 700 may be several separate devices and/or one device incorporating several devices or the functions of several devices, such as command action implementation device 470, immersive feedback sensor 475, telerobot space mapping device 480, telerobot space network device 485, and telerobot 111.

In the example embodiment discussed above, telerobot space device 700 may be, for example, a telerobot 111 and/or a command action implementation device 470, such as BEAM PRO™ and BEAM+™ by Suitable Technologies, Inc., DOUBLE® by Double Robotics, Inc., AVA® by iRobot, and the like. As discussed above, telerobot 111 and/or command action implementation device 470 (and/or another telerobot space device 700) may receive command action stream 109 from user space device 500 and execute command action implementation module 1200, implementing command action stream 109 and causing telerobot 111 to move along path 114 in telerobot space 110. As telerobot 111 moves along path 114, immersive feedback sensor 475, which may be part of telerobot 111 and/or a separate device, my record/encode and send immersive feedback stream 113 to operator 101 and/or user space device 500, allowing operator 101 to experience video recorded by telerobot 111 (described as being executed by or within command action implementation module 1200).

Figure 2:
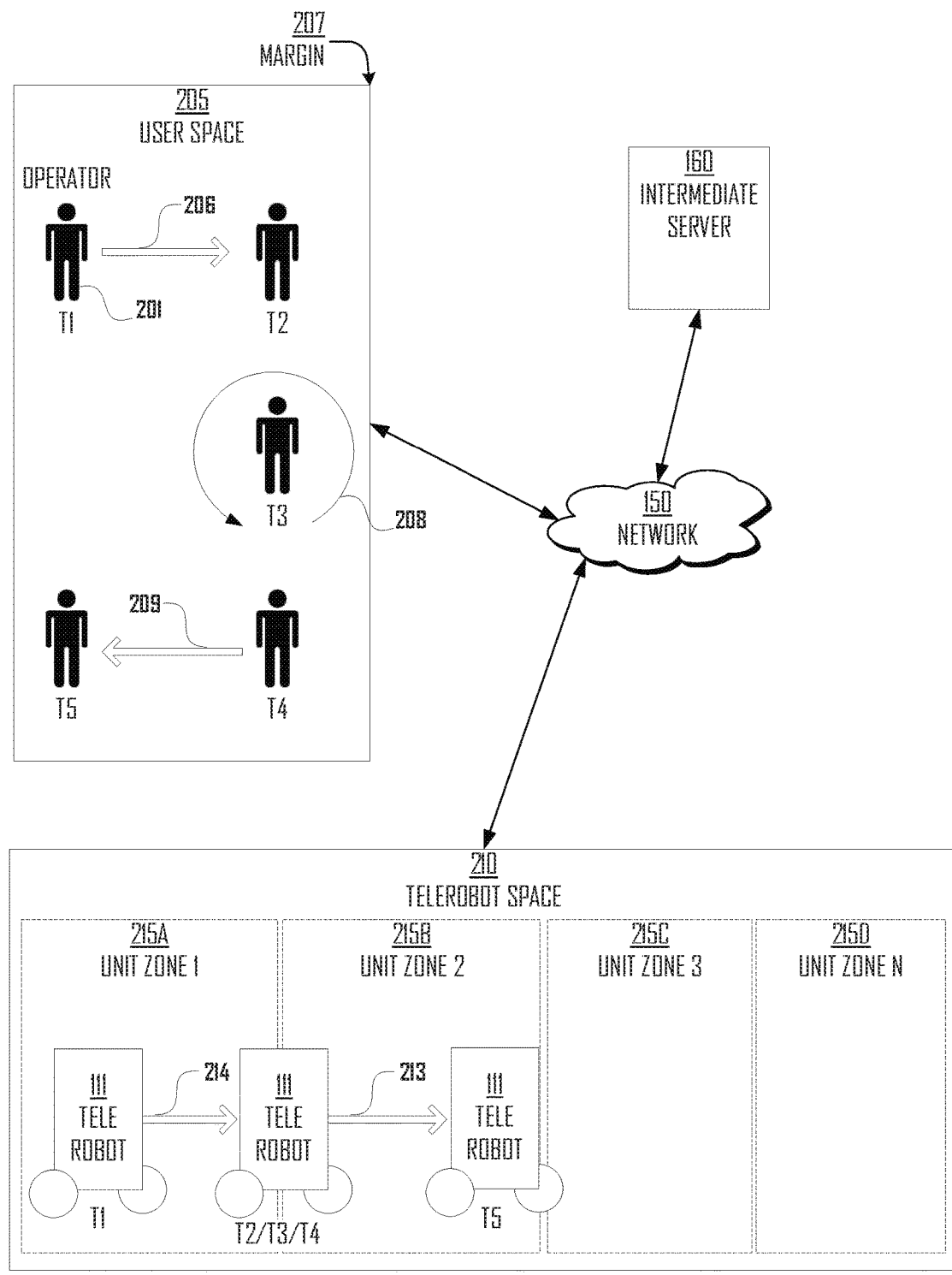
FIG. 2 is a network and device diagram illustrating a second view of exemplary networks and computer devices configured according to the present disclosure, deployed in physical spaces, and in which a user controls a remote telerobot via motion.

Turning to FIG. 2, operator 201 moves along path 206 between a first time, T1, and a second time, T2, sending a command action stream to telerobot 111 instructing telerobot 111 to move, resulting in movement along path 214, and receiving an immersive feedback stream from telerobot 111 in response (for the sake of convenience, separate streams are not illustrated in FIG. 2, as they are in FIG. 1).

When operator 201 reaches or becomes proximate to margin 207, such as at T2, operator 201's position or movement triggers suspension of the command action stream (described in greater detail, further below). With the command action stream suspended, operator 201 may re-orient within user space 205, without sending a command action stream which might otherwise cause telerobot 111 to move in a corresponding way. During this time, telerobot 111 may stop moving. Operator 201's re-orientation is illustrated in FIG. 2 with curved arrow 208.

Following re-orientation of operator 201 at T3, interpretation of operator 201's movements as command action instructions may be re-engaged. Operator 201's re-orientation may be to turn around by 180 degrees, though it may be for a lesser or greater number of degrees. Re-engagement of interpretation of operator 201's movements as command action instructions may be triggered by, for example, a re-orientation which is no longer into or no longer predicted to be into margin 207. The new orientation and heading of operator 201 which is no longer into margin 207 may be normalized or established as a new baseline relative to the existing orientation and heading of telerobot 111.

At T4 (a time subsequent to T3), Operator 201 may then move along path 209, resulting in a second portion of the command action stream, instructing telerobot 111 to move along path 213. Operator 201 may reach the same or another margin, which may trigger suspension of the command action stream, allowing operator 201 to re-orient, etc. Thereby, operator 201 may control telerobot 111 via movement mapping, while operator 201 moves in a user space which is not the same size as the telerobot space. This may avoid potentially unpleasant or even harmful disjunction with respect to the senses of operator 201.

As illustrated in FIG. 2, telerobot space 210 may be divided into "unit zones" (unit zone 1 215A, unit zone 2 215B, unit zone 3 215C, through unit zone N 215D are illustrated by way of example in FIG. 2). The unit zones may correspond to user space 205. Unit zones are described further herein.

Figure 3:
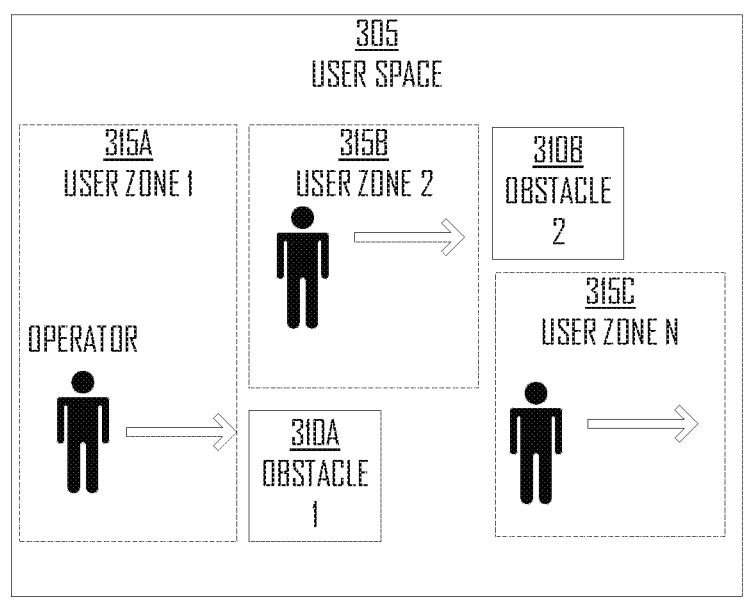
FIG. 3 is a diagram illustrating an exemplary user space, divided into user zones.

As illustrated in FIG. 3, a user space, such as user space 305, may be divided into one or more user zones (illustrated are user zone 1 315A, user zone 2 315B, and user zone N 315C). The user zones may have margins, such as user space margin 107 and margin 207, though these margins may be created relative to obstacles, such as obstacle 1 310A and obstacle 2 310B. As discussed above in relation to movement of operator relative to user space margin 107 and margin 207, operator(s) may move within the user zones, with suspension of the command action stream upon the operator reaching or becoming proximate to the margin of a user zone. Division of a user space into user zones and navigation therein is described further herein.

As illustrated in FIG. 4, user space device 500 may represent and/or comprise one or more devices, such as movement mapping device 405, immersive feedback device 410, space mapping device 415, proximity sensor 420, and user space network device 425.

Movement mapping device 405 may be a device, such as a virtual reality headset (also discussed in relation to immersive feedback device 410), a game computer system or other computer system which maps movement (such as, for example, an XBOX® KINECT® console) and converts such movement into command actions sent to a telerobot. Conversion of movement into command actions is described further in relation to, for example, movement mapping module 900. Immersive feedback device 410 may be, for example, a virtual reality headset, a screen, an audio output device, a haptic output device, or the like.

Space mapping device 415 may map the user space and may participate in division of user space into user zones. Space mapping device 415 may be a component of an immersive feedback device 410 and/or movement mapping device 405. For example, space mapping device 415 may be a component of an immersive feedback device 410 which records the movements (attitude, heading and vector) of immersive feedback device 410 and user, thereby mapping user space according to the movements of use. Alternatively and/or in addition, space mapping device 415 may be a component of movement mapping device 405, such as a game computer system or other computer system which maps user movement and which may also map a space in which a user is located using a 3D scanner (such as, for example, an XBOX® KINECT® console). Alternatively and/or in addition, space mapping device 415 may be a 3D scanner. Space mapping device 415 may receive reflected or emitted acoustic, radio-frequency, electro-magnetic, or other wave energy, and may generate and/or interpolate, for example, a point cloud for a space.

Proximity sensor 420 may sense the proximity of a user or operator to a margin of a user space or user zone. Proximity sensor 420 may be a component of another device, such as of movement mapping device 405, immersive feedback device 410, space mapping device 415, or the like. Proximity sensor 420 may sense proximity to solid objects such as walls, obstacles according to, for example, reflected or emitted acoustic, radio-frequency, electro-magnetic, or other wave energy, magnetic fields, by measured location compared to a map, or by other geo-fence demarcation indicating or detecting techniques.

User space network device 425 may be a network device which provides local-area network services among components within user space.

As illustrated in FIG. 4, telerobot space device 700 may represent and/or comprise one or more devices, such as command action implementation device 470, immersive feedback sensor 475, telerobot space mapping device 480, telerobot space network device 485, and telerobot 111. Command action implementation device 470 may receive a command action stream and implement it, such as via command action implementation module 1200, causing telerobot to move. Immersive feedback sensor 475 may record or encode one or more sensor data, such as images or audio, and may transmit these to operator and/or user space device 500. Telerobot space mapping device 480 may map telerobot space and may participate in division of telerobot space into unit zones, such as via telerobot space mapping module 1300. Telerobot space mapping device 480 may operate in a way similar or equivalent to space mapping device 415. Telerobot space network device 485 may be a network device which provides local-area network services among components within telerobot space. Telerobots and telerobot 111 are discussed herein.

With respect to user space device 500 and telerobot space device 700, one or more of these devices and/or services provided by modules in such a device may be combined into and/or provided by another of such devices. For example, a virtual reality headset may function as a movement mapping device, as an immersive feedback device, as a space mapping device, and/or as a proximity sensor, and the like. For example, a telerobot may function as a command action implementation device, immersive feedback sensor, telerobot space mapping device, telerobot space network device, and the like.

As illustrated in FIGS. 1, 2, and 4, communication between operator 101, user space device 500 and telerobot 111 and telerobot space device 700 may take place across or be facilitated by network 150 and intermediate server 160. This paper discusses communication as occurring between operator 101, user space device 500 and telerobot 111 and telerobot space device 700. Such communication may occur across network 150. One or more computers, remote from operator 101, user space device 500, telerobot 111, and/or telerobot space device 700, such as intermediate server 160, may provide modules and/or services which are described herein as being provided by modules within user space device 500, telerobot 111, and telerobot space device 700.

With respect to network 150, such a network may comprise computers, network connections among the computers, and software routines to enable communication between the computers over the network connections. Examples of network 150 comprise an Ethernet network, the Internet, and/or a wireless network, such as a Wi-Fi, GSM, TDMA, CDMA, EDGE, HSPA, LTE or other network provided by or independently of a wireless service provider. Connection to network 150 may be via a Wi-Fi connection. More than one network may be involved in a communication session between the illustrated devices. Connection to network 150 may require that the computers execute software routines which enable, for example, the seven layers of the OSI model of computer networking or equivalent in a wireless phone network.

This paper may discuss a first computer as connecting to a second computer (such as telerobot space device 700 connecting to user space device 500) or to a corresponding datastore (such as to user space device datastore 600); it should be understood that such connections may be to, through, or via the other of the two components (for example, a statement that a computer device connects with or sends data to user space device 500 should be understood as saying that the computer device may connect with or send data to user space device datastore 600). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computer device, the software routines, modules, and data groups used by the software modules or routines may be stored and/or executed remotely relative to any of the computers through, for example, application virtualization Turning to FIG. 5, this figure illustrates a functional block diagram of an exemplary user space device, such as user space device 500, and some data structures and/or components thereof. As discussed in relation to FIG. 4, user space device 500 may represent and/or comprise one or more devices, such as movement mapping device 405, immersive feedback device 410, space mapping device 415 proximity sensor 420, and user space network device 425. Such user space device or devices are illustrated, together as one device in user space device 500, though it should be understood that multiple separate such devices may be used.

Figure 5:
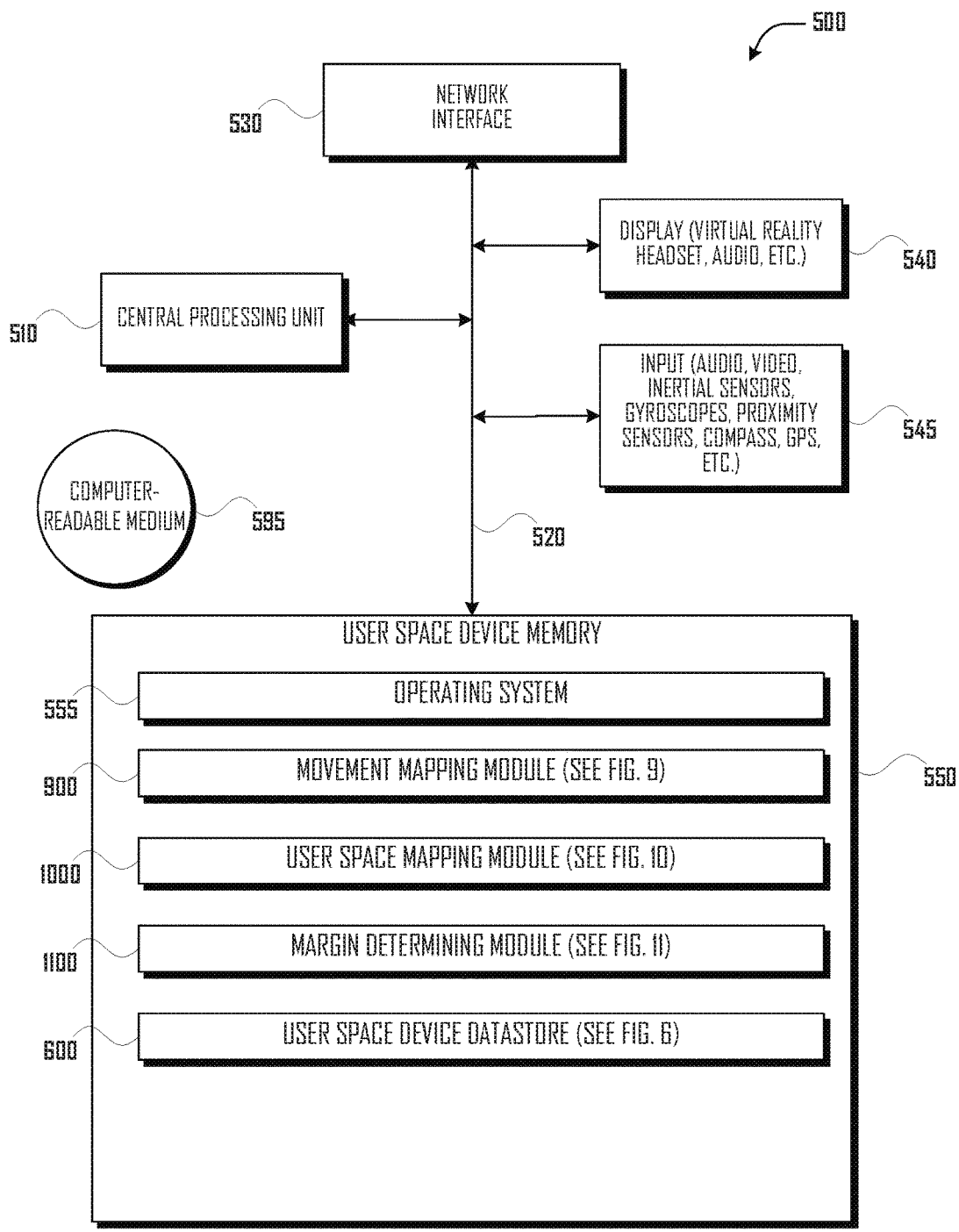
FIG. 5 is a functional block diagram illustrating an exemplary user space device.

As illustrated in FIG. 5, user space device 500 comprises at least one processing unit 510, user space device memory 550, display 540 and input 545, all interconnected along with network interface 530 via bus 520. Display 540 may comprise, for example, a virtual reality headset, a projector, a display, a screen, auditory output device(s), haptic output device(s), and the like. Input 545 is discussed further, herein.

Processing unit 510 may comprise one or more general-purpose central processing units ("CPU") as well as one or more special-purpose graphics processing units ("GPU"). The components of the processing unit 510 may be utilized by operating system 555 for different functions required by the modules or routines executed by user space device 500. Network interface 530 may be utilized to form connections with network 150 or to form device-to-device connections with other computers. Network interface 530 may be used by, for example, user space network device 425.

User space device memory 550 generally comprises a random access memory ("RAM"), a read only memory ("ROM"), and a permanent mass storage device, such as a disk drive or SDRAM (synchronous dynamic random-access memory). User space device memory 550 stores program code for software modules or routines, such as, for example, movement mapping module 900, user space mapping module 1000, and margin determining module 1100, as well as, for example, browser, email client and server routines, client applications, and database applications (discussed further below). Additional data groups for modules or routines, such as for a webserver and web browser, may also be present on and executed by user space device 500. Webserver and browser modules may provide an interface for interacting with the other computer devices, for example, through webserver and web browser modules (which may serve and respond to data and information in the form of webpages and html documents or files). The browsers and webservers are meant as examples of user-interface and user-interface enabling routines generally, and may be replaced by equivalent modules or routines for serving and rendering information to and in a device and/or user interface in a computer device (whether in a web browser or in, for example, a mobile device application).

In addition, user space device memory 550 also stores an operating system 555. These software components may be loaded from a non-transient computer readable storage medium 595 into user space device memory 550 using a drive mechanism (not shown) associated with a non-transient computer readable storage medium 595, such as a floppy disc, tape, DVD/CD-ROM drive, memory card, or other like storage medium. In some embodiments, software components may also or instead be loaded via a mechanism other than a drive mechanism and computer readable storage medium 595 (e.g., via network interface 530).

User space device 500 may also comprise hardware supporting input modalities, input 545. Input 545 may comprise, for example, auditory input, video or image input, distance measurement input (such as from a range camera), inertial sensor and/or gyroscopic sensor input (which may measure attitude of a device or person wearing the device in terms of roll, pitch, and yaw), compass sensor input, proximity sensor input (such as, for example, proximity of a user to a margin or to another device), global positioning system ("GPS") input, and the like from corresponding devices capable of producing such input. Input 545 may also serve as display 540, as in the case of a touchscreen display which also serves as input 545, and which may respond to input in the form of contact by a finger or stylus with a surface of input 545.

Figure 6:
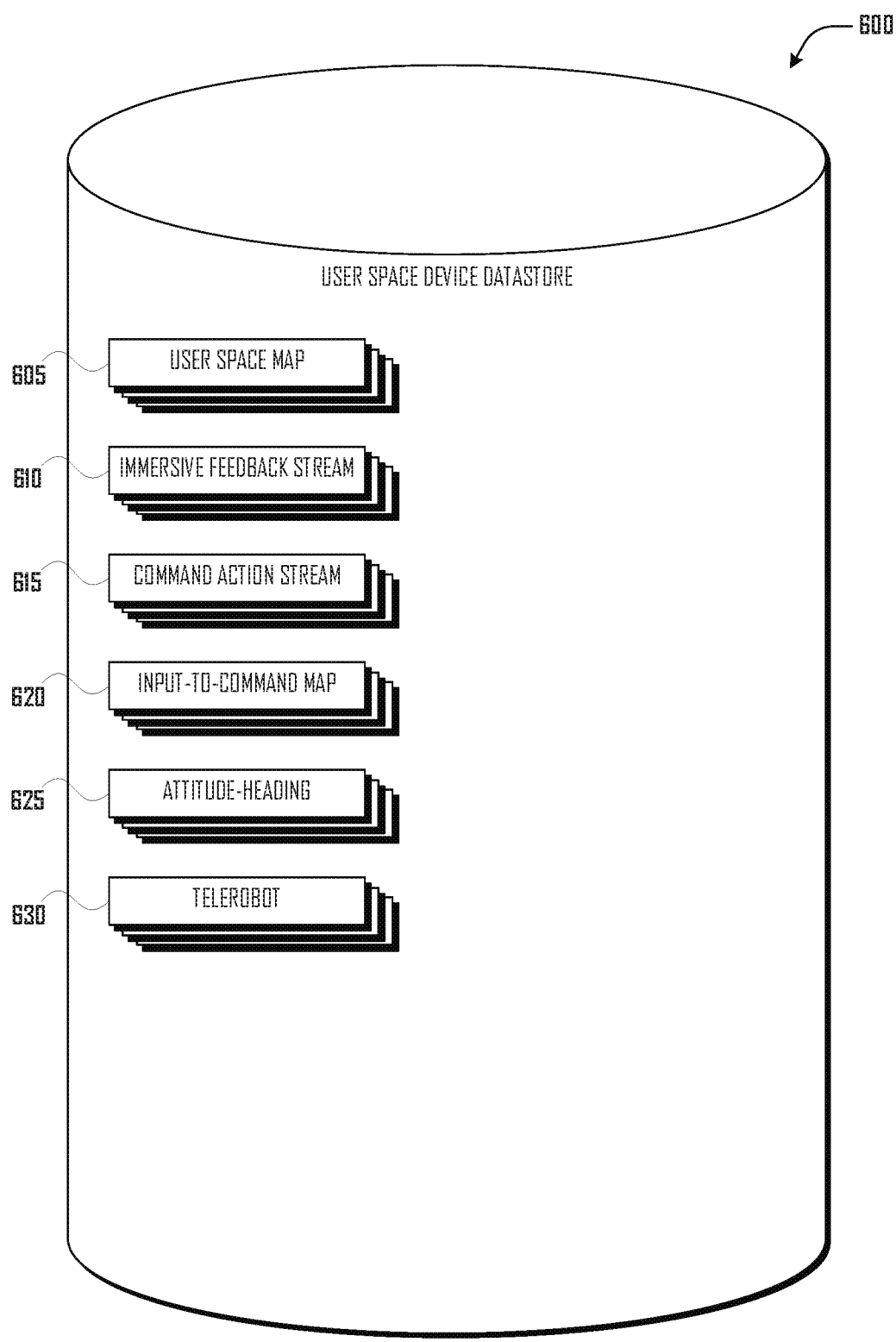
FIG. 6 is a functional block diagram illustrating an exemplary user space device datastore, including examples of data records therein.

User space device 500 may also comprise or communicate via bus 520 with user space device datastore 600, illustrated further in FIG. 6. In various embodiments, bus 520 may comprise a storage area network ("SAN"), a high speed serial bus, and/or via other suitable communication technology. In some embodiments, user space device 500 may communicate with user space device datastore 600 via network interface 530. User space device 500 may, in some embodiments, include many more components than those shown in this Figure. However, it is not necessary that all of these generally conventional components be shown in order to disclose an illustrative embodiment.

FIG. 6 is a functional block diagram of the user space device datastore 600 illustrated in the computer device of FIG. 5. The components of the user space device datastore 600 are data groups used by modules or routines. The data groups used by modules or routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The components of user space device datastore 600 are, for example, user space map 605, immersive feedback stream 610, command action stream 615, input-to-command map 620, attitude-heading 625, and telerobot 630. These records are discussed further herein in the discussion of other of the Figures. In overview, user space map 605 record may be a record comprising a user space map created by, for example, user space mapping module 1000. In overview, immersive feedback stream 610 may be a record comprising an immersive feedback stream received from telerobot space device 700. In overview, command action stream 615 record may be a command action stream, including a portion of a command action stream, created by movement mapping module 900 and sent or to be sent to telerobot space device 700. In overview, input-to-command map 620 record may be used by, for example, movement mapping module 900 to convert user and other input into command action stream 615. In overview, attitude-heading 625 record may comprise a reference attitude and heading as well as a current attitude and heading, as may be used by, for example, movement mapping module 900. In overview, telerobot 630 record may comprise information regarding a telerobot 111 or telerobot space device 700 with which a user, operator, or user space device 500 is paired, such as by movement mapping module 900 and/or command action implementation module 1200.

Figure 7:
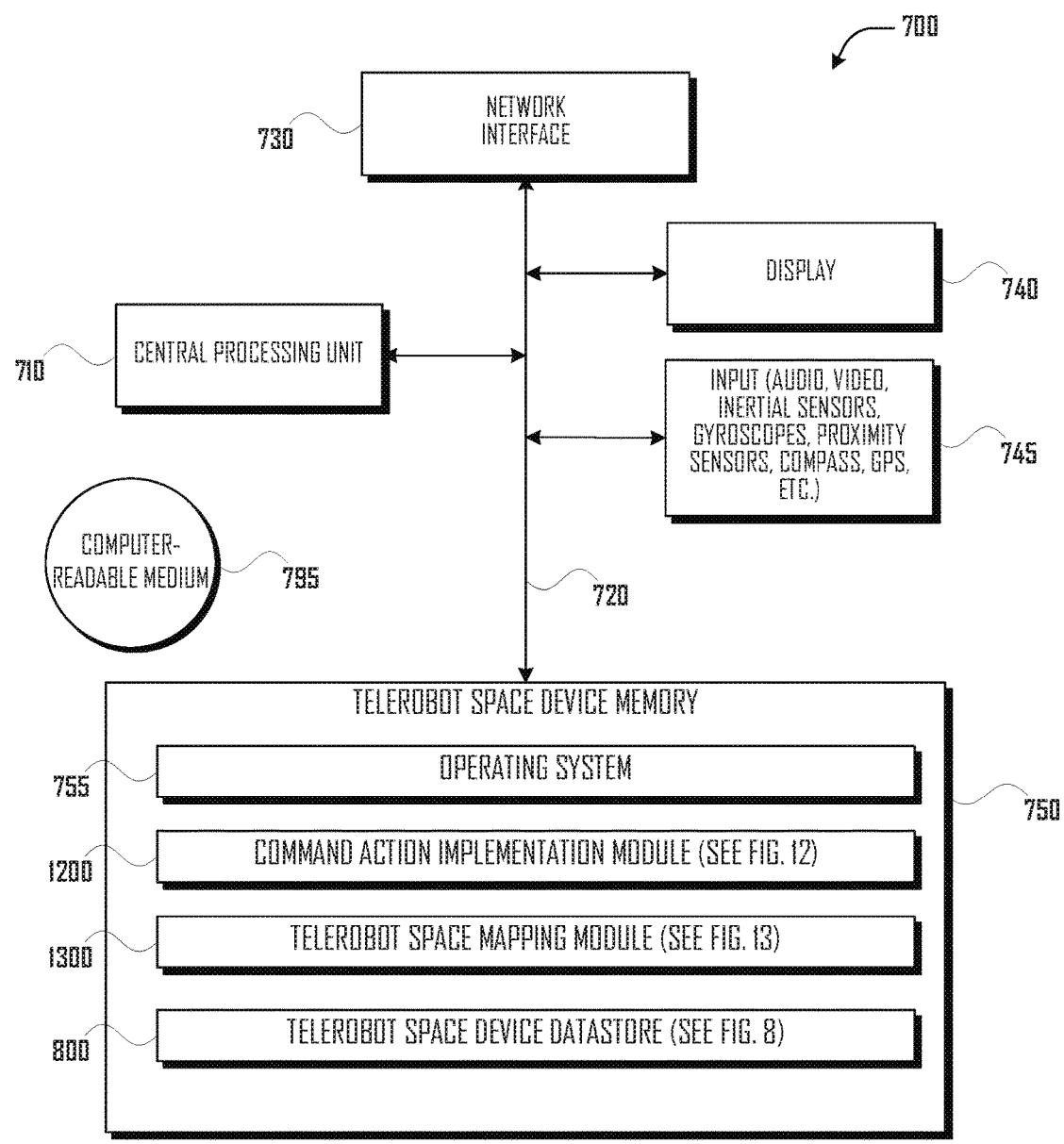
FIG. 7 is a functional block diagram illustrating an exemplary telerobot space device.

Turning to FIG. 7, this figure illustrates a functional block diagram of an exemplary telerobot space device, such as telerobot space device 700, and some data structures and/or components thereof. As discussed in relation to FIG. 4, telerobot space device 700 may represent and/or comprise one or more devices, such as command action implementation device 470, immersive feedback sensor 475, telerobot space mapping device 480, telerobot space network device 485, and telerobot 111. Such telerobot space device or devices are illustrated, together as one device in telerobot space device 700, though it should be understood that multiple separate such devices may be used.

As illustrated in FIG. 7, telerobot space device 700 comprises at least one processing unit 710, telerobot space device memory 750, display 740 and input 745, all interconnected along with network interface 730 via bus 720. Display 740 may comprise, for example, a projector, a display, a screen, a virtual reality headset, auditory output device(s), haptic output device(s), and the like. Input 745 is discussed further, herein.

Processing unit 710 may comprise one or more general-purpose central processing units ("CPU") as well as one or more special-purpose graphics processing units ("GPU"). The components of processing unit 710 may be utilized by operating system 755 for different functions required by the modules or routines executed by telerobot space device 700. Network interface 730 may be utilized to form connections with network 150 or to form device-to-device connections with other computers. Network interface 730 may be used by, for example, telerobot space network device 485.

Telerobot space device memory 750 generally comprises a random access memory ("RAM"), a read only memory ("ROM"), and a permanent mass storage device, such as a disk drive or SDRAM (synchronous dynamic random-access memory). Telerobot space device memory 750 stores program code for software modules or routines, such as, for example, command action implementation module 1200 and telerobot space mapping module 1300, as well as, for example, browser, email client and server routines, client applications, and database applications (discussed further below). Additional data groups for modules or routines, such as for a webserver and web browser, may also be present on and executed by telerobot space device 700. Webserver and browser modules may provide an interface for interacting with the other computer devices, for example, through webserver and web browser modules (which may serve and respond to data and information in the form of webpages and html documents or files). The browsers and webservers are meant as examples of user-interface and user-interface enabling routines generally, and may be replaced by equivalent modules or routines for serving and rendering information to and in a device and/or user interface in a computer device (whether in a web browser or in, for example, a mobile device application).

In addition, telerobot space device memory 750 also stores an operating system 755. These software components may be loaded from a non-transient computer readable storage medium 795 into telerobot space device memory 750 using a drive mechanism (not shown) associated with a non-transient computer readable storage medium 795, such as a floppy disc, tape, DVD/CD-ROM drive, memory card, or other like storage medium. In some embodiments, software components may also or instead be loaded via a mechanism other than a drive mechanism and computer readable storage medium 795 (e.g., via network interface 730).

Telerobot space device 700 may also comprise hardware supporting input modalities, input 745. Input 745 may comprise, for example, auditory input, video or image input, distance measurement input (such as from a range camera), inertial sensor and/or gyroscopic sensor input (which may measure attitude of telerobot in terms of roll, pitch, and yaw), compass sensor input, proximity sensor input (such as, for example, proximity of a telerobot to a margin or to another device), global positioning system ("GPS") input, and the like from corresponding devices capable of producing such input. Input 745 may also serve as display 740, as in the case of a touchscreen display which also serves as input 745, and which may respond to input in the form of contact by a finger, stylus, or the like with a surface of input 745.

Figure 8:
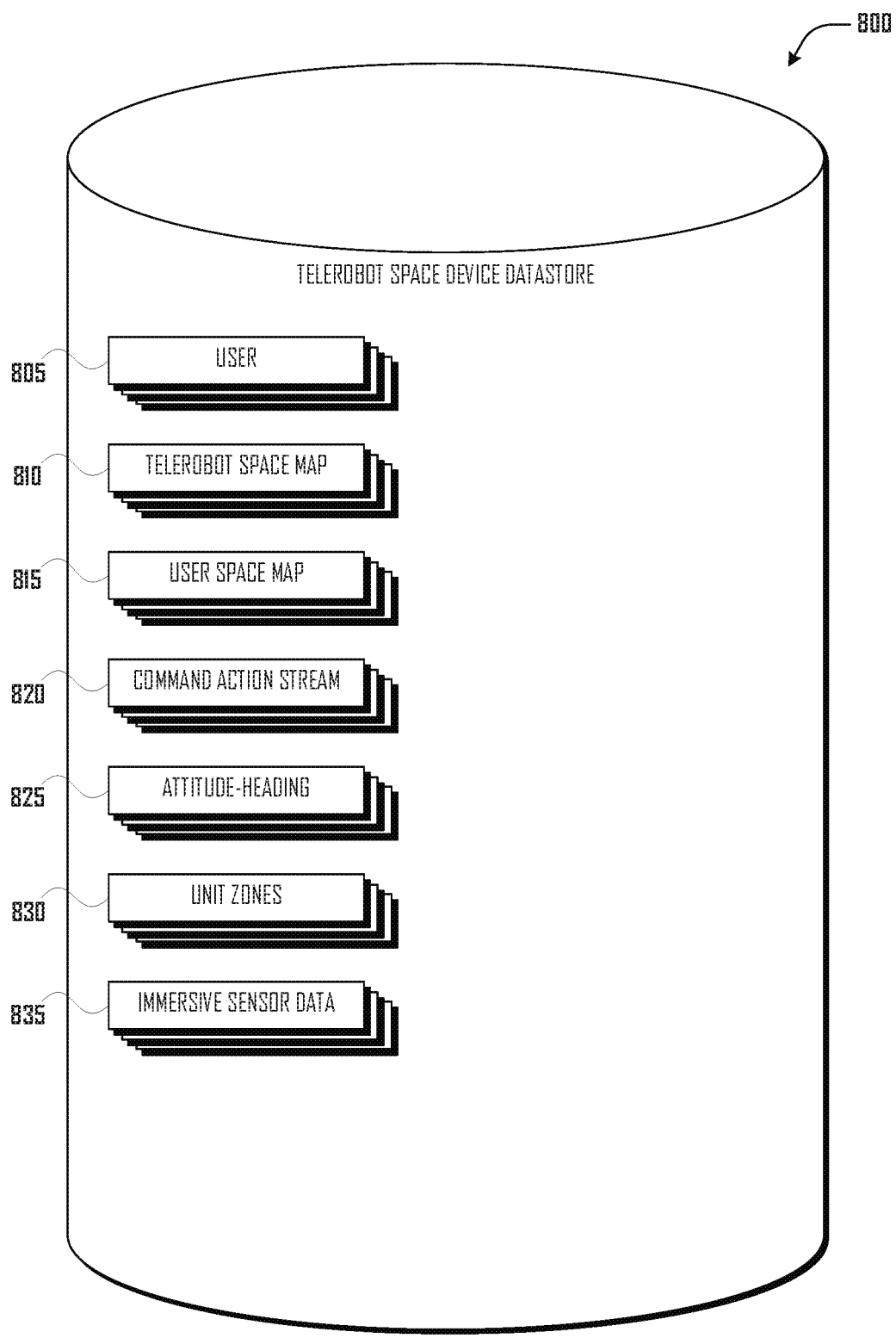
FIG. 8 is a functional block diagram illustrating an exemplary telerobot space device datastore, including examples of data records therein.

Telerobot space device 700 may also comprise or communicate via bus 720 with telerobot space device datastore 800, illustrated further in FIG. 8. In various embodiments, bus 720 may comprise a storage area network ("SAN"), a high speed serial bus, and/or via other suitable communication technology. In some embodiments, telerobot space device 700 may communicate with telerobot space device datastore 800 via network interface 730. Telerobot space device 700 may, in some embodiments, include many more components than those shown in this Figure. However, it is not necessary that all of these generally conventional components be shown in order to disclose an illustrative embodiment.

FIG. 8 is a functional block diagram of the telerobot space device datastore 800 illustrated in the computer device of FIG. 7. The components of telerobot space device datastore 800 are data groups used by modules or routines. The data groups used by modules or routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The components of telerobot space device datastore 800 are, for example, user 805, telerobot space map 810, user space map 815, command action stream 820, attitude-heading 825, unit zones 830, and immersive sensor data 835 records. These records are discussed further herein in the discussion of other of the Figures. In overview, user 805 record may comprise information regarding a user, operator, or user space device 500 with which a telerobot or telerobot space device 500 is paired, such as by movement mapping module 900 and/or command action implementation module 1200. In overview, telerobot space map 810 may be a record comprising a telerobot space map, which may be created by and divided into unit zones 830 by, for example, telerobot space mapping module 1300. In overview user space map 815 may be a user space map received by telerobot space device 700 and used by telerobot space mapping module 1300 to divide telerobot space into unit zones 830. User space map 815 may comprise divisions, such as user zones. In overview, command action stream 820 may be a command action stream or portion of a command action stream created by movement mapping module 900 and received by telerobot space device 700. In overview, attitude-heading 825 records may comprise a reference attitude and heading and/or a current attitude and heading of a user and/or telerobot 111. In overview, unit zone 830 records comprise units within a telerobot zone, such as in a telerobot space map 810, corresponding to a user space and/or user zones.

Unit zone 830 records may be created by, for example, telerobot space mapping module 1300. In overview, immersive sensor data 835 records may comprise encoded sensor data, such as data from immersive feedback sensor 475, which data may be stored temporarily or permanently in such records.

Figure 9:
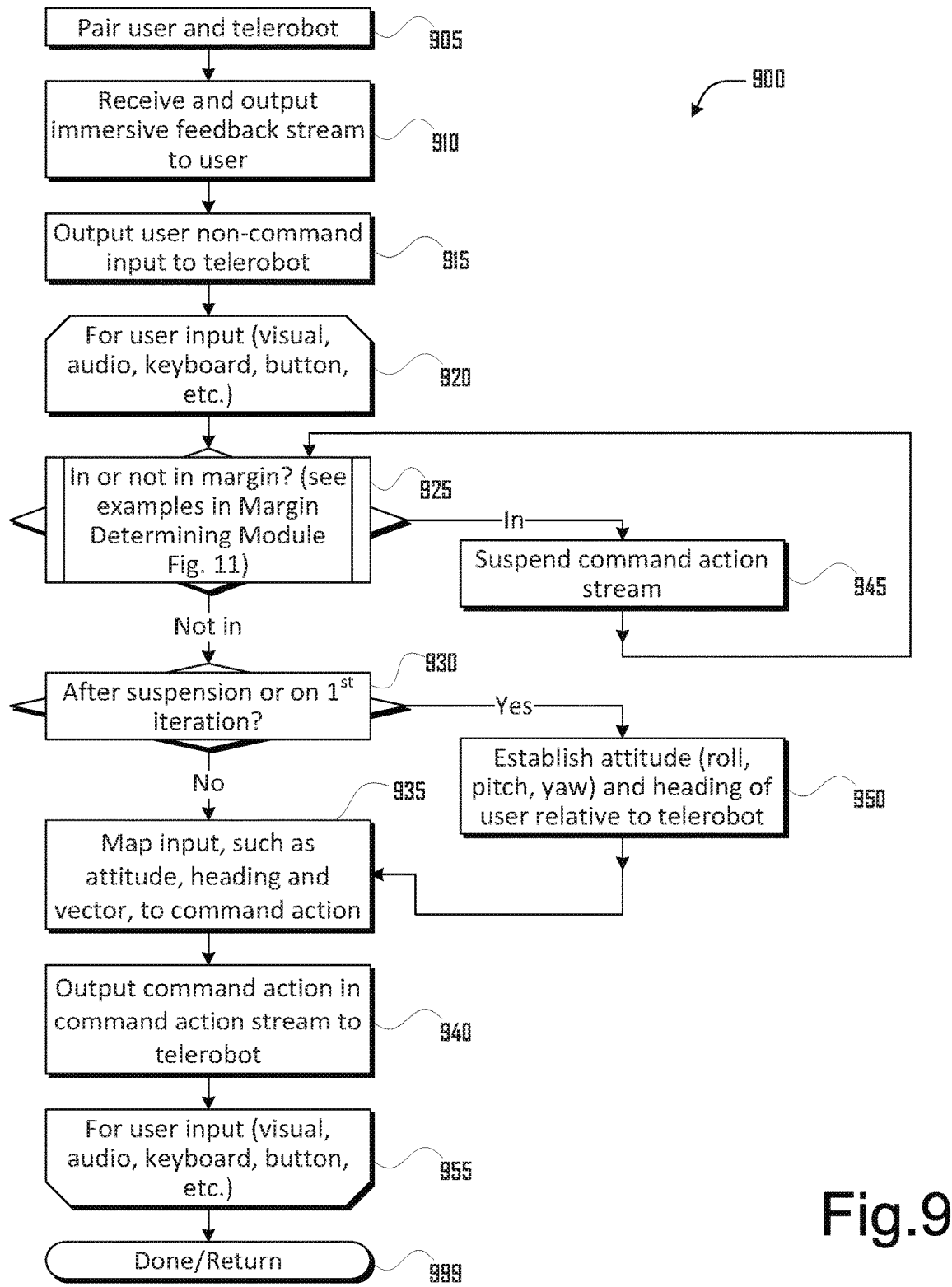
FIG. 9 is a flow diagram illustrating an example/algorithmic structure of a movement mapping module, according to various embodiments.

FIG. 9 is a flow diagram illustrating an example/algorithmic structure of movement mapping module 900, according to various embodiments. As noted, movement mapping module 900 may be executed by, for example, user space device 500, which may be, for example, a virtual reality headset, to provide movement mapping service, through operations performed at block 905-999. At block 905, if not already performed, movement mapping module 900 pairs a user or user space device 500, with a telerobot, such that a command action stream from movement mapping module 900 will be sent to and acted upon by telerobot and such that an immersive feedback stream from the paired telerobot will be sent to and output by paired user space device 500. Records regarding telerobots, whether paired or otherwise, may be stored, for example, in one or more telerobot 630 records.

At block 910, movement mapping module 900 may receive, decode, and output via user space device 700 an immersive feedback stream to a user of user space device 500. A received immersive feedback stream may be stored, including stored temporarily, in one or more immersive feedback stream 610 records.

Opening loop block 920 through closing loop block 955 may iterate for input and/or user input received, for example, from input 545, such as within a not-previously suspended command action stream portion.

At decision block 925, a determination may be made regarding whether user user space device 500, such as a virtual reality headset) is in, is proximate to, or is predicted to be in or proximate to a user space margin, such as user space margin 107 or margin 207. Examples regarding how this determination may be made are illustrated with respect to FIG. 11 and margin determining module 1100.

If user is in or is proximate to a user space margin, then at block 945 movement mapping module 900 may suspend a command action stream, if one is already being transmitted. Suspension of a command action stream may involve discontinuing transmission of a command action stream, it may involve sending a signal to telerobot to suspend implementation of a command action stream, it may involve discontinuing conversion of attitude, heading and vector of user (or user space device) into command action stream, or the like.

At decision block 930, which may follow decision block 925 if it was determined that user was not in (or not proximate to or predicted to enter) margin, movement mapping module 900 may determine whether block 930 follows a suspension of a command action stream or on a first iteration of opening loop block 920 to closing loop block 955 with respect to a command action stream portion.

If affirmative (or the equivalent) at decision block 930, movement mapping module 900 may, at block 950, establish a starting reference attitude (roll, pitch, and yaw) and heading (compass heading) of user relative to the then-current attitude and heading of telerobot to establish equivalent attitude and heading between the two. The reason for this may be that, at block 935, movement mapping module 900 converts attitude and heading of user into command actions directed to telerobot. If this conversion is with respect to changes in such data relative to a starting attitude and heading or if this conversion is with respect to an absolute attitude and heading of user (not with respect to changes relative to a starting point), a starting point may be selected or the attitude and heading of user may be determined and normalized relative to the attitude and heading of the telerobot (such that a user heading of North may be equivalent to a telerobot heading of East—the user and telerobot do not have to be aligned on the same axis, just so long as they agree on an equivalence). If this conversion is with respect to changes in such data relative to a previous instance of such data (such as across a very short span of time, on the order of milliseconds), then the normalization procedure of block 950 may not be necessary; however, foregoing agreement on equivalence and using only changes in attitude and heading may be subject to greater drift (for example, is there is a systematic error in determining such change). A reference attitude and heading as well as a current attitude and heading may be stored in, for example, in one or more attitude-heading 625 records.

If negative (or equivalent) at decision block 930—which, for example, may occur if a previous command action stream portion was suspended or if opening loop block 920 to closing loop block 955 are iterating over a still-current, not suspended, command action stream portion—movement mapping module 900 may at block 935 map the then-current input (of opening loop block 920 to closing loop block 955) to one or more command action instructions. Movement mapping module 900 may accomplish this according to a map, mapping input to command actions. Such a map may be found in, for example, input-to-command map 620. For example, a gross movement of user in a direction heading) and at a rate (vector) may be mapped to a command action instruction to telerobot to move in a gross manner an equivalent direction and at the same, similar, or a proportional rate. For example, a change in attitude (such as roll, pitch, and yaw) of user or a component of user (such as a hand or head) may be mapped to a command action instruction to telerobot to change attitude of telerobot or a component of telerobot in the same, similar, or a proportional manner. Mapping input to command actions may be with respect to control devices, structures, or surfaces of telerobot, such as with respect to drive motors, steering actuators, control surface actuators, and the like.

At block 940, movement mapping module 900 may output the command action instructions of block 935 as a discrete command action instruction(s) or as a continuation of a continuous or nearly continuous stream of command action instructions. Records containing command action instructions may be stored, for example, in one or more command action stream 615 records.

At closing loop block 955, movement mapping module 900 may return to opening loop block 920 to iterate over the next input and/or user input.

At done block 999, movement mapping module 900 may conclude or return to a process which spawned it.

Figure 10:
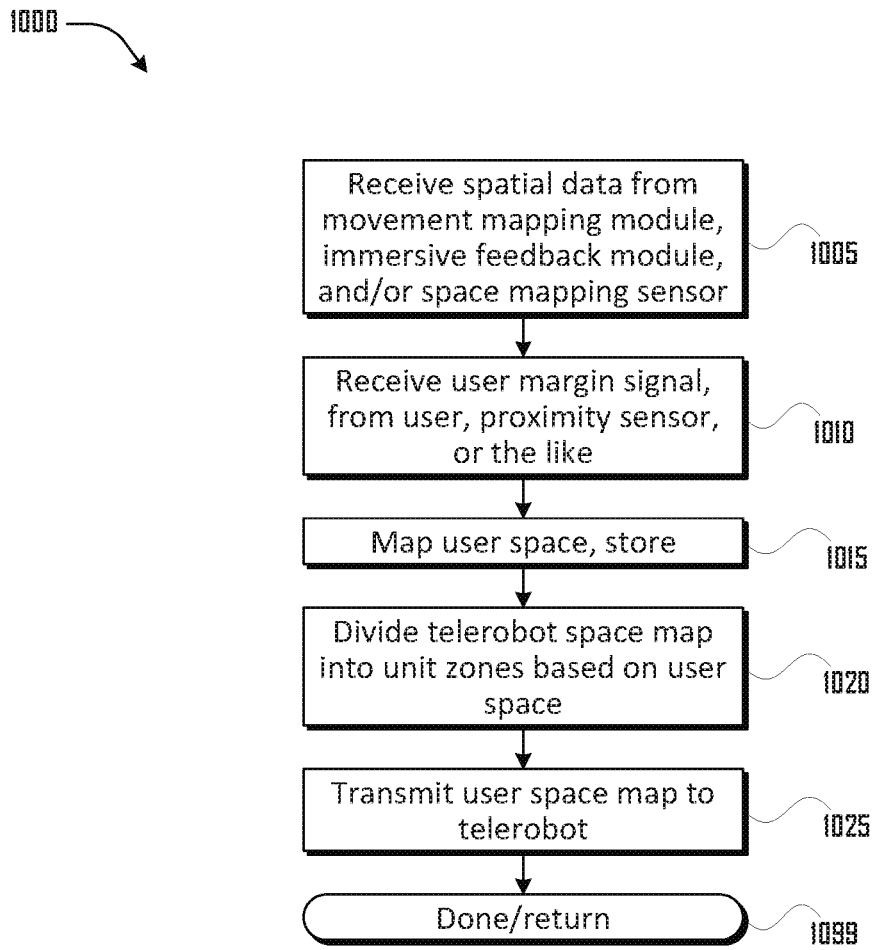
FIG. 10 is a flow diagram illustrating an example/algorithmic structure of a user space mapping module, according to various embodiments.

FIG. 10 is a flow diagram illustrating an example/algorithmic structure of a user space mapping module 1000, according to various embodiments. User space snapping module 1000 may, for example, map user space, through operations performed at blocks 1005-1099.

At block 1005, user space mapping module 1000 may receive spatial data. Spatial data may come from a variety of sources, such as, for example, movement mapping device 405 and movement mapping module 900, immersive feedback device 410, space mapping device 415 and the like. Spatial data may comprise absolute or relative attitude, heading, and vector information of a user and/or user space device, as may be provided by GPS, position and location services, inertial and gyroscopic sensors, and the like. Spatial data may also comprise information regarding user space, such as a point cloud of user space, such as from space mapping device 415. Spatial data may also be provided by a map, building plan or the like. Spatial data may comprise information regarding both margin and obstacles in user space, such as, for example obstacle 1 310A and obstacle 2 310B

At block 1010, user space mapping module 1000 may receive a user margin signal. A user margin signal is a signal that the user is at or entering a margin of user space and/or that user has encountered an obstacle. Such a signal may come from user, such as by activation of a button, touch, or voice control or the like. Such as signal may alternatively or in addition come from movement mapping device 405, immersive feedback device 410, space mapping device 415, proximity sensor 420 and the like. This signal may assist in identifying margins and obstacles of user space.

At block 1015, user space mapping module 1000 may map user space based on information received in block 1005 and/or block 1010. The resulting user space map may be stored as, for example, one or more user space map 605 records.

At block 1020, user space mapping module 1000 may divide user space, as may be mapped in user space map, into user zones, such as user zone 1 315A, user zone 2 315B, and user zone N 315C. Division into user zones may be based on the presence of obstacles which may prevent or impede the movement of user in user space. The presence of obstacles may be identified in user margin signal received at block 1010 and/or in spatial data received at block 1005.

At block 1025, user space mapping module 1000 may transmit user space map to another device or module, such as to telerobot and/or, for example, telerobot space mapping module 1300.

At block 1099, user space mapping module 1000 may conclude or return to a process which spawned it.

Figure 11:
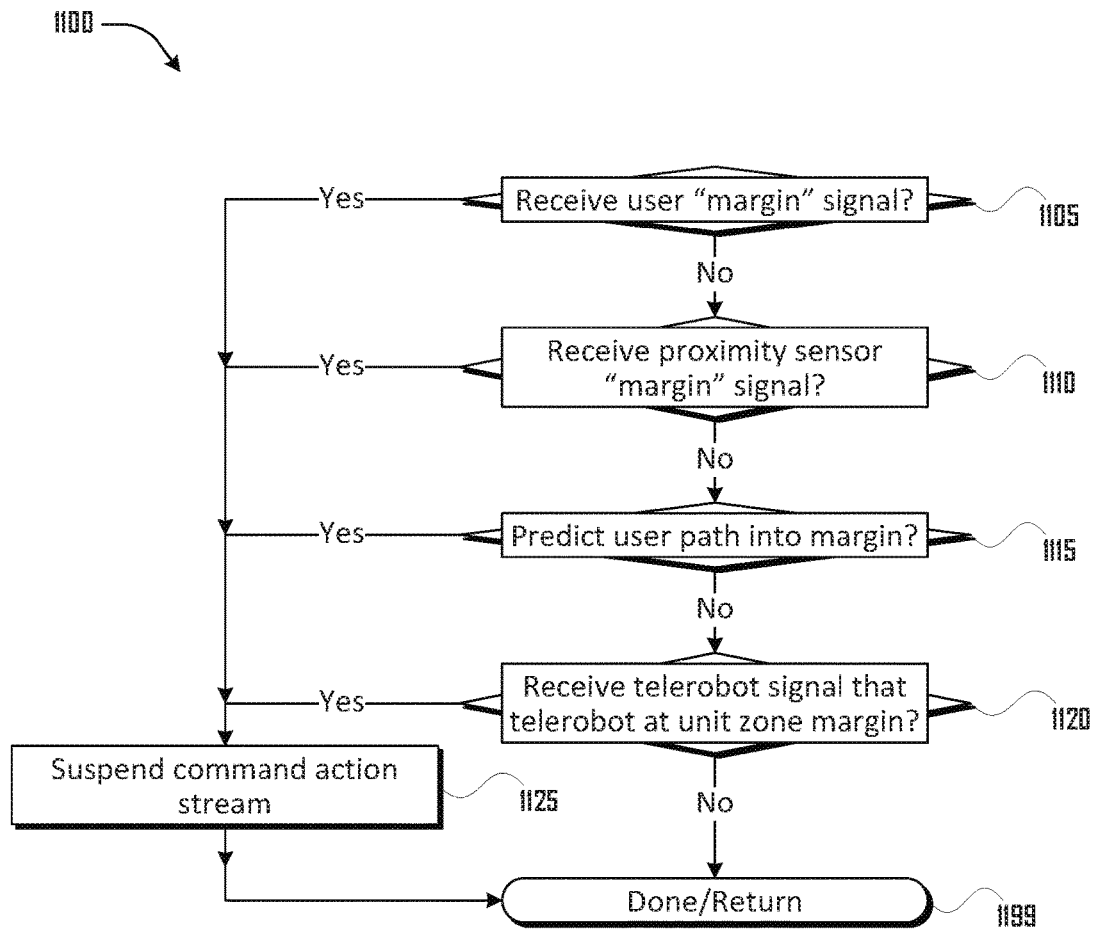
FIG. 11 is a flow diagram illustrating an example/algorithmic structure of a margin determining module, according to various embodiments.

FIG. 11 is a flow diagram illustrating an example/algorithmic structure of a margin determining module 1100, according to various embodiments. Margin determining module 1100 may be executed by, for example one or more user space device 500, to provide margin determining service, through operations performed at blocks 1105-1199. Margin determining module 1100 may be called by another module, such as by movement mapping module 900.

At decision block 1105, margin determining module 1100 may determine whether a user margin signal has been received, indicating that user has reached a margin of user space. A user margin signal is a signal that the user is at or entering a margin of user space. Such a signal may come from user, such as by activation of a button, touch, or voice control or the like. Such as signal may alternatively or in addition come from movement mapping device 405, immersive feedback device 410, space mapping device 415, proximity sensor 420 and the like. This signal may originate independently or may come via or from user space mapping module 1000.

If negative (or equivalent) at decision block 1105, and if not already performed in decision block 1105, at decision block 1110, margin determining module 1100 may determine whether a proximity sensor 420 has generated a user margin signal.

If negative (or equivalent) at decision block 1110, margin determining module 1100 may determine whether a predicted path of user is into a known margin of user zone. This prediction may be based on a map of user space, such as user space map 605, relative to a measured or provided position and vector of user within user space, as may be provided or produced by movement mapping device 405, movement mapping module 900, space mapping device 415, user space mapping module 1000, and the like. Such a prediction may provide a buffer, so that the prediction will occur a time before user would enter or encounter the margin.

If negative (or equivalent) at decision block 1115, at decision block 1120, margin determining module 1100 may determine whether a signal has been received from telerobot indicating that telerobot has reached or is proximate to a unit zone margin in telerobot space. Such a signal may be produced by, for example, command action implementation module 1200.

If affirmative (or equivalent) at decision block 1105, 1110, 1115, and/or 1120, at block 1125, margin determining module 1100 may output a signal to suspend or indicating that a command action stream should be suspended. Suspension of a command action stream is discussed herein, for example, in relation to block 945 of movement mapping module 900.

At done block 1199, margin determining module 1100 may conclude and/or return to a process which spawned it.

Figure 12:
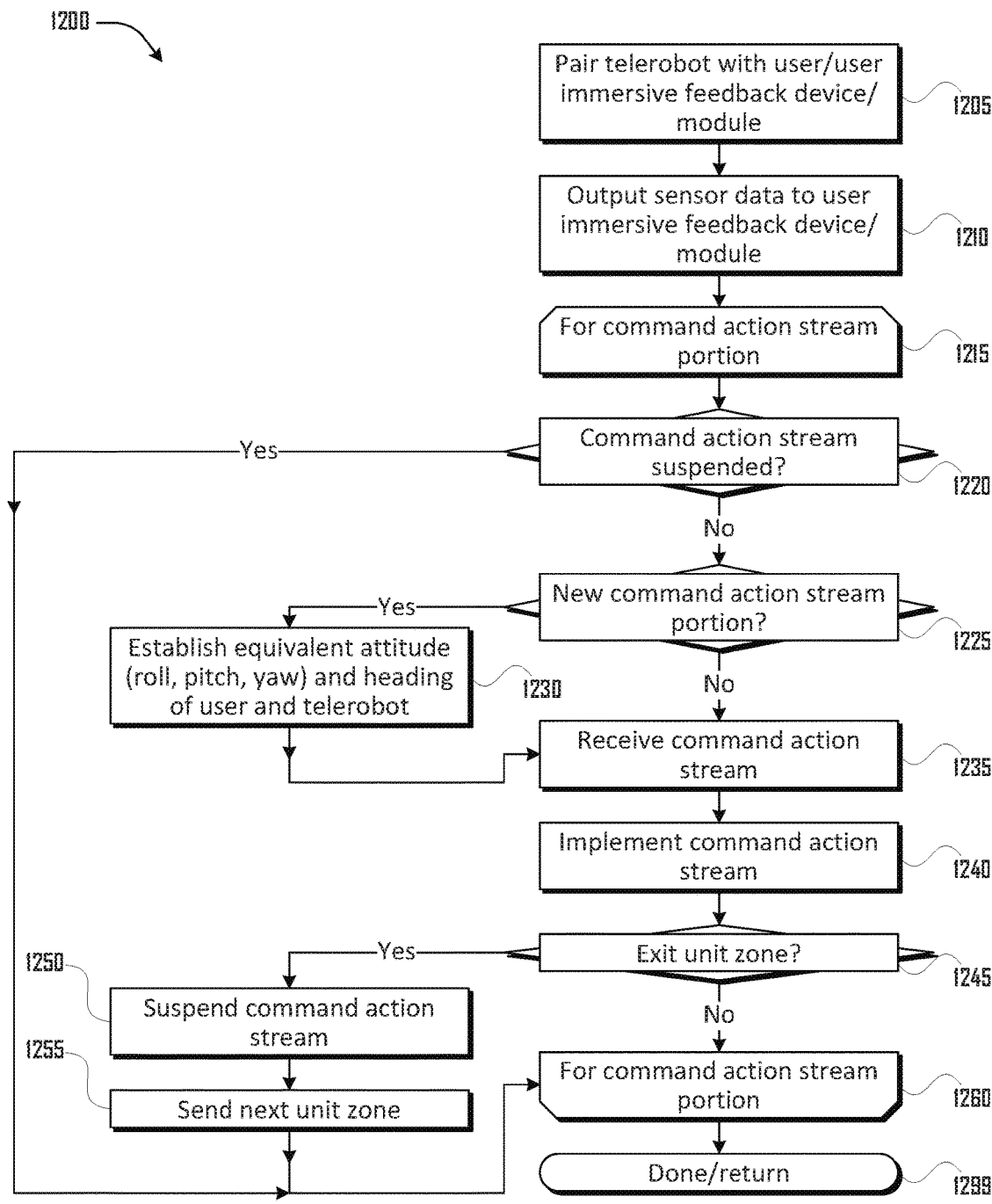
FIG. 12 is a flow diagram illustrating an example/algorithmic structure of a command action implementation module, according to various embodiments.

FIG. 12 is a flow diagram illustrating an example/algorithmic structure of a command action implementation module 1200, according to various embodiments. Command action implementation module 1200 may be executed by, for example, telerobot space device 700, such as by telerobot 111 or a device which controls or communicates with telerobot 111, such as command action implementation device 470, to implement command actions through operations performed at blocks 1205-1299.

At block 1205, if not already performed, command action implementation module 1200 may pair telerobot with user and/or a user space device, such as an immersive feedback device 410. Information regarding user and/or user space device may be stored in, for example, one or more user 805 records.

At block 1210, command action implementation module 1200 may output encoded sensor data, such as data from immersive feedback sensor 475, to immersive feedback device 410 and/or a module executed by a user space device. The sensor data may be stored, even temporarily, as one or more immersive sensor data 835 records. Upon receipt by the intended recipient, the immersive sensor data may be decoded and output by immersive feedback device 410.

Opening loop block 1215 to closing loop block 1260 may iterate for each command action and/or command action stream portion received from, for example, movement mapping module 900. Portions of a command action stream may be defined according to, for example, portions of a command action stream which occur between suspensions of a command action stream, as discussed in relation to block 945 of FIG. 9 and opening loop block 920 to closing loop block 955 of FIG. 9.

At decision block 1220, command action implementation module 1200 may determine whether a then-current command action portion has been suspended, such as by a signal from, for example, movement mapping module 900 and/or margin determining module 1100. Such a signal may also be produced by command action implementation module 1200, such as in relation to block 1250 (discussed further herein).

At decision block 1225, command action implementation module 1200 may determine whether a new command action stream portion has been started since the last iteration of opening loop block 1215 to closing loop block 1260. Decision block 1225 is similar to decision block 930 and block 950 in movement mapping module 900, in that upon an affirmative determination (or equivalent) at decision block 1225, a decision may be made regarding whether equivalent attitudes and headings of user and telerobot need to be established, which may also be referred to herein as "normalization" of the respective attitudes and headings of user and telerobot. This may be required, for example on a first iteration of opening loop block 1215 to closing loop block 1260 with respect to a new command action stream portion. This may not be required if the command action stream does not describe an absolute attitude and heading or an attitude and heading relative to a starting point, but merely a change in attitude and heading.

If affirmative at decision block 1225 (or equivalent), at block 1230, command action implementation module 1200 may normalize the respective attitudes and headings of user and telerobot.

At block 1235, command action implementation module 1200 may receive a command action, command action stream, and/or command action stream portion, such as from movement mapping module 900.

At block 1240, command action implementation module 1200 may implement the command action of block 1235, such as by causing motors, actuators, and the like to engage to move telerobot in a way corresponding to the motions of user in user space.

At decision block 1245, command action implementation module 1200 may determine whether telerobot has exited a unit zone, such as following implementation of command action stream of block 1240. This may be performed by reference to unit zone 830 records and a known, calculated, or determined position of telerobot in telerobot space.

If affirmative (or equivalent) at decision block 1245, at block 1250 command action implementation module 1200 may suspend the then-current command action stream portion, which may include sending a signal to user space device 500 and/or movement mapping module 900 and/or margin determining module 1100. Suspension of command action stream is discussed in detail in relation to block 945.

At block 1255, command action implementation module 1200 may transmit an identifier of a next unit zone into which telerobot is predicted to move.

At block 1260, command action implementation module 1200 may return to block 1215 to iterate over the next command action stream portion.

At block 1299, which may occur upon occurrence of a condition which interrupts command action implementation module 1200, such as an instruction to unpair telerobot from user, an error, or the like, command action implementation module 1200 may conclude and/or may return to a process which spawned it.

Figure 13:
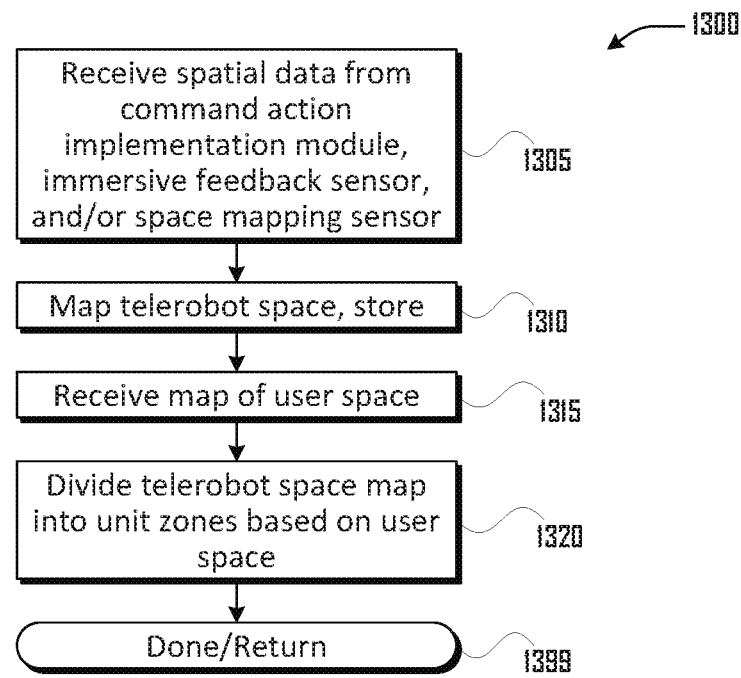
FIG. 13 is a flow diagram illustrating an example/algorithmic structure of telerobot space mapping module, according to various embodiments.

FIG. 13 is a flow diagram illustrating an example/algorithmic structure of telerobot space mapping module 1300, according to various embodiments. Telerobot space mapping module 1300 may be executed by, for example, telerobot space device 700, such as by command action implementation device 470, telerobot space mapping device 480, and/or telerobot 111, to provide telerobot space mapping service through performance of operations at blocks 1305-1399.

At block 1305, telerobot space mapping module 1300 may receive spatial data for telerobot space. Spatial data may come from a variety of sources, such as, for example, command action implementation device 470, command action implementation module 1200, immersive feedback sensor 475, telerobot space mapping device 485 and the like. Spatial data may comprise absolute or relative attitude, heading, and vector information of a telerobot and/or telerobot space device, as may be provided by GPS, position and location services, inertial and gyroscopic sensors, and the like. Spatial data may also comprise information regarding telerobot space, such as a point cloud of telerobot space, such as from telerobot space mapping device 480. Spatial data may also be provided by a map, building plan or the like.

At block 1310, telerobot space mapping module 1300 may map telerobot space based on information received in block 1305. The resulting telerobot space map may be stored as, for example, one or more telerobot space map 810 records.

At block 1315, telerobot space mapping module 1300 may receive a map of user space and/or a user zone in user space. This may be received from, for example, user space mapping module 1000. This map may correspond to information illustrated in FIG. 3. User space map (and/or user zones in user space map) may be stored in telerobot space device as one or more user space map 815 records.

At block 1320, telerobot space mapping module 1300 may divide the telerobot space, such as telerobot space in telerobot space map 810 records, into unit zones, such as unit zone 1 215A, unit zone 2 215B, unit zone 3 215C, based on the map of user space and/or based on a user zone in user space (which may also be in the map of user space). The objective of this block is to identify unit zones in telerobot space which correspond to user space or a user zone in user space. Unit zones may be stored as, for example, one or more unit zone 830 records.

At block 1399, telerobot space mapping module 1300 may conclude or return to a process which spawned it.

As discussed above, a user may thereby move in a user space which is a different size than telerobot space, the movements of user may be movement mapped by a user space device such as an immersive feedback device, with the resulting command actions sent to a telerobot as, for example, a first portion of a command action stream. Immersive feedback may be provided to user and user space device by telerobot; user may respond to the immersive feedback with additional movements which result in more command actions sent to telerobot as part of command action stream. Upon movement of user into or proximate to a margin of user space, the command action stream may be suspended, paused, or otherwise stopped. The user may re-orient in the user space, and may then continue to move, with movement mapping re-engaged and resumption of transmission of a second portion of command action stream. In this way, user may control a telerobot, even though user space and telerobot space may not be the same size. Disorienting or otherwise undesirable feedback in immersive feedback stream which may conflict or not agree with user's experience of user space is avoided.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computer system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1

An apparatus for implementing movement mapping based telepresence interactions between a human user and a remote telerobot, comprising: a computer processor and a memory; a movement mapping module coupled to the computer processor; wherein the movement mapping module is to provide a command action stream to the remote telerobot, wherein to provide the command action stream, the movement mapping module is to convert a first attitude and vector of the human user within a user zone into a first portion of the command action stream and, following a command action suspension, detect a second attitude and vector of the human user and convert the second attitude and vector of the human use into a second portion of the command action stream; and wherein the command action suspension is triggered by a proximity of the human user to a margin of the user zone.

Example 2

The apparatus according to Example 1, wherein the proximity of the human user to the margin of the user zone is determined according to at least one of a signal from the human user, a signal from a proximity sensor, a predicted path of the human user based on the first attitude and vector of the human user and a map of the user zone, or a proximity of the remote telerobot to a unit zone of a remote space of the remote telerobot.

Example 3

The apparatus according to Example 2, further comprising a human user space mapping module and wherein the predicted path of the human user based on the first attitude and vector and the map of the user zone is predicted by the human user space mapping module.

Example 4

The apparatus according to Example 3, wherein the human user space mapping module is further to map the user zone.

Example 5

The apparatus according to Example 4, wherein the human user space mapping module is to map the user zone according to a spatial data received from one of the movement mapping module, an immersive feedback module, and a space mapping sensor.

Example 6

The apparatus according to Example 2, wherein the signal from the human user comprises at least one of a speech command and a command from a physical button.

Example 7

The apparatus according to Example 2, wherein the proximity sensor is a component of at least one of an immersive feedback device or the user zone.

Example 8

The apparatus according to Example 1, further comprising an immersive feedback module to output an immersive feedback stream to the human user, wherein to output the immersive feedback stream to the human user comprises receive the immersive feedback stream from the remote telerobot and output the immersive feedback stream to a virtual reality headset of the human user.

Example 9

The apparatus according to any one of Example 1 to Example 8, further comprising a remote telerobot unit zone mapping module to divide a remote space of the remote telerobot into one or more unit zones, wherein to divide the remote space of the remote telerobot into one or more unit zones comprises divide the remote space of the remote telerobot into one or more unit zones corresponding to the user zone.

Example 10

The apparatus according to any one of Example 1 to Example 8, wherein the command action suspension comprises at least one of a command to the remote telerobot to ignore the command action stream, a command to the movement mapping module to stop converting the first attitude and vector into the command action stream, or a cessation of transmission of the first portion of the command action stream to the remote telerobot.

Example 11

The apparatus according to Example 1, wherein the movement mapping module is to determine that the second attitude and vector is not toward the margin of the user zone.

Example 12

The apparatus according to any one of Example 1 to Example 8, wherein the movement mapping module is to normalize the first and second attitude and vector of the human user relative to an attitude and vector of the remote telerobot.

Example 13

The apparatus according to any one of Example 1 to Example 8, wherein attitude of the first and second attitude and vector comprises roll, pitch, and yaw and wherein vector of the first and second attitude and vector comprises translation through space.

Example 14

The apparatus according to any one of Example 1 to Example 8, wherein the margin comprises at least one of an obstacle or a boundary.

Example 15

An apparatus for implementing movement mapping based telepresence interactions between a telerobot and a remote human user, comprising: a computer processor and a memory; a command action implementation module, which module is coupled to the computer processor; wherein the command action implementation module is to implement a command action stream, wherein to implement the command action stream, the command action implementation module is to receive the command action stream from the remote human user and is to implement the command action stream in an attitude and vector of the telerobot; wherein the command action stream from the human user is to be suspended when the human user is proximate to a margin of a user zone.

Example 16

The apparatus according to Example 15, further comprising an immersive feedback sensor module coupled to the computer processor, wherein the immersive feedback sensor module is to provide an immersive feedback stream to the remote human user, wherein to provide the immersive feedback stream to the remote human user, the immersive feedback sensor module is to encode the immersive feedback stream and is to transmit the immersive feedback stream to a virtual reality headset of the remote human user.

Example 17

The apparatus according to Example 15, further comprising a telerobot unit zone mapping module coupled to the computer processor to map a space of the telerobot, wherein to map the space of the telerobot, the telerobot unit zone mapping module is to receive a map of the user zone, and is to divide the space of the telerobot into one or more unit zones corresponding to the user zone.

Example 18

The apparatus according to Example 17, wherein the telerobot unit zone mapping module is to map the space of the telerobot according to a spatial data received from at least one of the immersive feedback sensor module, the command action implementation module, and a space mapping sensor.

Example 19

The apparatus according to Example 17, wherein the telerobot unit zone mapping module is to transmit to a computer device of the remote human user an indicator that the telerobot is at a margin of a unit zone of the one or more unit zones.

Example 20

The apparatus according to Example 19, wherein the indicator that the telerobot is at the margin of the unit zone of the one or more unit zones is to suspend the command action stream from the human user.

Example 21

A computer implemented method of implementing movement mapping based telepresence interactions between a human user and a remote telerobot, comprising: converting a first attitude and vector of the human user within a user zone into a first portion of a command action stream and transmitting the first portion of the command action stream to the remote telerobot; detecting a suspension of the first portion of the command action stream; detecting a second attitude and vector of the human user; converting a second attitude and vector of the human user into a second portion of the command action stream; and transmitting the second portion of the command action stream to the remote telerobot.

Example 22

The method according to Example 21, wherein the suspension of the command action stream is triggered by a proximity of the human user to a margin of the user zone.

Example 23

The method according to Example 22, wherein the proximity of the human user to the margin of the user zone is determined according to at least one of receipt of a signal from the human user, receipt of a signal from a proximity sensor, receipt of a signal from the remote telerobot regarding the proximity of the remote telerobot to a unit zone of a remote space of the remote telerobot, or predicting a path of the human user to the margin of the user zone based on the first attitude and vector and a map of the user zone.

Example 24

The method according to Example 23, wherein the signal received from the human user comprises at least one of a speech command and a command from a physical button.

Example 25

The method according to Example 23, wherein the proximity sensor is a component of at least one of an immersive feedback device or the user zone.

Example 26

The method according to Example 21, further comprising mapping the user zone according to a spatial data, wherein the spatial data is received from at least one of an immersive feedback device of the human user and a space mapping sensor.

Example 27

The method according to Example 26, further comprising transmitting a map of the user zone to the remote telerobot.

Example 28

The method according to any one of Example 21 to Example 27, further comprising determining that the second attitude and vector is not toward the margin of the user zone.

Example 29

The method according to any one of Example 21 to Example 27, further comprising outputting to a virtual reality headset of the human user an immersive feedback stream from the remote telerobot.

Example 30

The method according to any one of Example 21 to Example 27, further comprising normalizing the first and second attitude and vector of the human user relative to an attitude and vector of the remote telerobot.

Example 31

The method according to any one of Example 21 to Example 27, further comprising, suspending the command action stream by at least one of transmitting a command to the remote telerobot to ignore the first portion of the command action stream, stopping conversion of the first attitude and vector into the first portion of the command action stream, or ceasing to transmit the first portion of the command action stream to the remote telerobot.

Example 32

The method according to any one of Example 21 to Example 27, wherein attitude of the first and second attitude and vector comprises roll, pitch, and yaw and wherein vector of the first and second attitude and vector comprises translation through space.

Example 33

The method according to any one of Example 21 to Example 27, further comprising dividing a remote space of the remote telerobot into one or more unit zones corresponding to the user zone.

Example 34

The method according to any one of Example 21 to Example 27, wherein the margin comprises at least one of an obstacle or a boundary.

Example 35

An method of implementing movement mapping based telepresence interactions between a telerobot and a remote human user, comprising: receiving a command action stream from the remote human user and implementing the command action stream in an attitude and vector of the telerobot; wherein the command action stream from the human user is to be suspended when the human user is proximate to a margin of a user zone.

Example 36

The method according to Example 35, further comprising transmitting to a virtual reality headset of the remote human user an immersive feedback stream from an immersive feedback sensor in the telerobot.

Example 37

The method according to Example 35, further comprising mapping a space of the telerobot, receiving a map of the user zone, and dividing the space of the telerobot into one or more unit zones corresponding to the user zone.

Example 38

The method according to Example 37, wherein mapping the space of the telerobot is mapping according to a spatial data received from at least one of the immersive feedback sensor and a space mapping sensor.

Example 39

The method according to Example 37, further comprising transmitting to a computer device of the remote human user a signal that the telerobot is at a margin of a unit zone of the one or more unit zones.

Example 40

The method according to Example 39, wherein the signal that the telerobot is at the margin of the unit zone of the one or more unit zones suspends the command action stream.

Example 41

An computer apparatus for implementing movement mapping based telepresence interactions between a human user and a remote telerobot, comprising: means to convert a first attitude and vector of the human user within a user zone into a first portion of a command action stream; means to transmit the first portion of the command action stream to the remote telerobot; means to detect a suspension of the first portion of the command action stream: means to detect a second attitude and vector of the human user; means to convert a second attitude and vector of the human user into a second portion of the command action stream; and means to transmit the second portion of the command action stream to the remote telerobot.

Example 42

The apparatus according to Example 41, wherein the means to detect the suspension of the command action stream comprise means to determine a proximity of the human user to a margin of the user zone.

Example 43

The apparatus according to Example 42, wherein the means to determine a proximity of the human user to a margin of the user zone comprise means to receive a signal from the human user, means to receive a signal from a proximity sensor, means to receive a signal from the remote telerobot regarding the proximity of the remote telerobot to a unit zone of a remote space of the remote telerobot, or means to predict a path of the human user to the margin of the user zone based on the first attitude and vector and a map of the user zone.

Example 44

The apparatus according to Example 43, further comprising means to determine at least one of a speech command and a command from a physical button as the signal received from the human user.

Example 45

The apparatus according to Example 41, further comprising means to map the user zone according to a spatial data, and further comprising means to receive the spatial data from at least one of an immersive feedback device of the human user and a space mapping sensor.

Example 46

The apparatus according to Example 45, further comprising means to transmit a map of the user zone to the remote telerobot.

Example 47

The apparatus according to any one of Example 41 to Example 46, further comprising means to determine that the second attitude and vector is not toward the margin of the user zone.

Example 48

The apparatus according to any one of Example 41 to Example 46, further comprising means to output to a virtual reality headset of the human user an immersive feedback stream from the remote telerobot;

Example 49

The apparatus according to any one of Example 41 to Example 46, further comprising means to normalize the first and second attitude and vector of the human user relative to an attitude and vector of the remote telerobot.

Example 50

The apparatus according to any one of Example 41 to Example 46, further comprising, means to suspend the command action stream by at least one of means to transmit a command to the remote telerobot to ignore the first portion of the command action stream, means to stop conversion of the first attitude and vector into the first portion of the command action stream, or means to cease to transmission of the first portion of the command action stream to the remote telerobot.

Example 51

The apparatus according to any one of Example 41 to Example 46, wherein attitude of the first and second attitude and vector comprises roll, pitch, and yaw and wherein vector of the first and second attitude and vector comprises translation through space.

Example 52

The apparatus according to any one of Example 41 to Example 46, further comprising means to divide a remote space of the remote telerobot into one or more unit zones corresponding to the user zone.

Example 53

The apparatus according to any one of Example 41 to Example 46, wherein the margin comprises at least one of an obstacle or a boundary.

Example 54

An apparatus for implementing movement mapping based telepresence interactions between a telerobot and a remote human user, comprising: means to receive a command action stream from the remote human user and means to implement the command action stream in an attitude and vector of the telerobot; and means to suspend the command action stream from the human user when the human user is proximate to a margin of a user zone.

Example 55

The apparatus according to Example 23, further comprising means to provide an immersive feedback stream to a virtual reality headset of the remote human user; and further comprising means to map a space of the telerobot, means to receive a map of the user zone, and means to divide the space of the telerobot into one or more unit zones corresponding to the user zone.

Example 56

The apparatus according to Example 24, further comprising means to transmit to a computer device of the remote human user an indicator that the telerobot is at a margin of a unit zone of the one or more unit zones, wherein the indicator that the telerobot is at the margin of the unit zone of the one or more unit zones is to suspend the command action stream.

Example 57

One or more computer-readable media comprising instructions that cause a computing device, in response to execution of the instructions by one or more processors of the computing device, to implement movement mapping based telepresence interactions between a human user and a remote telerobot by: provide a command action stream to the remote telerobot by convert a first attitude and vector of the human user within a user zone into a first portion of the command action stream and, following a command action suspension, determine a second attitude and vector of the human user is not toward a margin of the user zone and convert the second attitude and vector of the human use into a second portion of the command action stream; detect the command action suspension by a proximity of the human user to the margin of the user zone, and wherein the margin comprises at least one of an obstacle or a boundary.

Example 58

The computer-readable media according to Example 57, wherein the proximity of the human user to the margin of the user zone is determined according to at least one of receipt of a signal from the human user, receipt of a signal from a proximity sensor, receipt of a signal from the remote telerobot regarding the proximity of the remote telerobot to a unit zone of a remote space of the remote telerobot, or predict a path of the human user to the margin of the user zone based on the first attitude and vector and a map of the user zone, wherein the signal received from the human user comprises at least one of a speech command and a command from a physical button.

Example 59

One or more computer-readable media comprising instructions that cause a computing device, in response to execution of the instructions by one or more processors of the computing device, to implement movement mapping based telepresence interactions between a telerobot and a remote human user by: receive a command action stream; implement the command action stream in an attitude and vector of the telerobot; wherein the command action stream from the human user is to be suspended when the human user is proximate to a margin of a user zone, which margin comprises at least one of an obstacle or a boundary.

Example 60

The computer-readable media according to Example 59, further comprising map a space of the telerobot, receive a map of the user zone, divide the space of the telerobot into one or more unit zones corresponding to the user zone, and transmit to a computer device of the remote human user a signal that the telerobot is at a margin of a unit zone of the one or more unit zones, wherein the signal that the telerobot is at the margin of the unit zone of the one or more unit zones suspends the command action stream.

The above Detailed Description is not intended to be exhaustive or to limit the disclosure to the precise form disclosed above. While specific embodiments of, and examples for, the disclosure are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

What is claimed is:

1. A computer implemented method of implementing movement mapping based telepresence interactions between a human user and a remote telerobot, comprising:
outputting to a virtual reality headset of the human user an immersive feedback stream from the remote telerobot;
converting a first attitude and vector of the human user within a user zone into a first portion of a command action stream and transmitting the first portion of the command action stream to the remote telerobot;
detecting a suspension of the first portion of the command action stream triggered by a signal from a margin determining module, wherein the signal is to indicate that the human user has reached a margin of the user zone;
determining a second attitude and vector of the human user not toward the margin of the user zone;
converting a second attitude and vector of the human user into a second portion of the command action stream; and
transmitting the second portion of the command action stream to the remote telerobot;
wherein the margin comprises at least one of an obstacle or a boundary.

2. The method according to claim 1, wherein a proximity of the human user to the margin of the user zone is determined according to at least one of receipt of a signal from the human user, receipt of a signal from a proximity sensor, receipt of a signal from the remote telerobot regarding the proximity of the remote telerobot to a unit zone of a remote space of the remote telerobot, or predicting a path of the human user to the margin of the user zone based on the first attitude and vector and a map of the user zone, wherein the signal received from the human user comprises at least one of a speech command and a command from a physical button.

3. The method according to claim 1, further comprising mapping the user zone according to a spatial data, wherein the spatial data is received from at least one of an immersive feedback device of the human user and a space mapping sensor, and transmitting a map of the user zone to the remote telerobot.

4. The method according to claim 1, further comprising normalizing the first and second attitude and vector of the human user relative to an attitude and vector of the remote telerobot.

5. The method according to claim 1, further comprising suspending the command action stream by at least one of transmitting a command to the remote telerobot to ignore the first portion of the command action stream, stopping conversion of the first attitude and vector into the first portion of the command action stream, or ceasing to transmit the first portion of the command action stream to the remote telerobot.

6. The method according claim 1, further comprising dividing a remote space of the remote telerobot into one or more unit zones corresponding to the user zone.

7. A method of implementing movement mapping based telepresence interactions between a telerobot and a remote human user, comprising:
receiving a command action stream from the remote human user and implementing the command action stream in an attitude and vector of the telerobot;
transmitting to a virtual reality headset of the remote human user an immersive feedback stream from an immersive feedback sensor in the telerobot;
wherein the command action stream from the human user is to be suspended when a signal indicates that the human user has reached a margin of a user zone; and
mapping a space of the telerobot according to a spatial data received from at least one of the immersive feedback sensor and a space mapping sensor, receiving a map of the user zone, and dividing the space of the telerobot into one or more unit zones corresponding to the user zone.

8. The method according to claim 7, further comprising transmitting to a computer device of the remote human user a signal that the telerobot is at a margin of a unit zone of the one or more unit zones wherein the signal that the telerobot is at the margin of the unit zone of the one or more unit zones suspends the command action stream.

9. One or more non-transient computer-readable media comprising instructions that cause a computer device, in response to execution of the instructions by one or more processors of the computer device, to implement movement mapping based telepresence interactions between a human user and a remote telerobot by:
provide a command action stream to the remote telerobot by convert a first attitude and vector of the human user within a user zone into a first portion of the command action stream and, following a command action suspension, determine a second attitude and vector of the human user is not toward a margin of the user zone and convert the second attitude and vector of the human user into a second portion of the command action stream;
detect the command action suspension by a signal to indicate that the human user has reached the margin of the user zone, and
wherein the margin comprises at least one of an obstacle or a boundary.

10. The computer-readable media according to claim 9, wherein a proximity of the human user to the margin of the user zone is determined according to at least one of receipt of a signal from the human user, receipt of a signal from a proximity sensor, receipt of a signal from the remote telerobot regarding the proximity of the remote telerobot to a unit zone of a remote space of the remote telerobot, or predicting a path of the human user to the margin of the user zone based on the first attitude and vector and a map of the user zone, wherein the signal received from the human user comprises at least one of a speech command and a command from a physical button.

11. One or more non-transient computer-readable media comprising instructions that cause a computer device, in response to execution of the instructions by one or more processors of the computer device, to implement movement mapping based telepresence interactions between a telerobot and a remote human user by:
receive a command action stream;
implement the command action stream in an attitude and vector of the telerobot;
wherein the command action stream from the human user is to be suspended when a signal indicates that the human user has reached a margin of a user zone, wherein the margin comprises at least one of an obstacle or a boundary; and map a space of the telerobot, receive a map of the user zone, divide the space of the telerobot into one or more unit zones corresponding to the user zone, and transmit to a computer device of the remote human user a signal that the telerobot is at a margin of a unit zone of the one or more unit zones, wherein the signal that the telerobot is at the margin of the unit zone of the one or more unit zones suspends the command action stream.

12. An apparatus for movement mapping based telepresence interactions, comprising:

a computer processor and a memory in a user space device; a movement mapping module coupled to the computer processor; the movement mapping module configured to provide a command action stream to a remote telerobot, wherein to provide the command action stream, the movement mapping module is further configured to convert a first attitude and vector of a human user within a user zone into a first portion of the command action stream and, following a command action suspension, determine a second attitude and vector of the human user is not toward a margin of the user zone and convert the second attitude and vector of the human user into a second portion of the command action stream;

the command action suspension to be triggered by a signal from a margin determining module, wherein the signal is to indicate that the human user has reached the margin of the user zone, and wherein the margin comprises at least one of an obstacle or a boundary.

13. The apparatus according to claim 12, further comprising the margin determining module coupled to the movement mapping module, the margin determining module configured to determine a proximity of the human user relative to the margin of the user zone, wherein to determine the proximity of the human user relative to the margin of the user zone, the margin determining module is further configured to determine the proximity of the human user according to at least one of a signal from the human user, a signal from a proximity sensor, a predicted path of the human user based on the first attitude and vector of the human user and a map of the user zone, or a proximity of the remote telerobot to a unit zone of a remote space of the remote telerobot.

14. The apparatus according to claim 13, further comprising a human user space mapping module coupled to the computer processor, the human user space mapping module configured to map the user zone, wherein to map the user zone, the human user space mapping module is further configured to map the user zone according to a spatial data received from one of the movement mapping module, an immersive feedback module, and a space mapping sensor and wherein the predicted path of the human user based on the first attitude and vector and the map of the user zone is predicted by the human user space mapping module; or further comprising an immersive feedback module coupled to the computer processor, the immersive feedback module configured to output an immersive feedback stream to the human user, wherein to output the immersive feedback stream to the human user, the immersive feedback module is configured to receive the immersive feedback stream from the remote telerobot and output the immersive feedback stream to a virtual reality headset of the human user.

15. The apparatus according to claim 12, further comprising a telerobot space mapping module coupled to the computer processor, the telerobot space mapping module configured to divide a remote space of the remote telerobot into one or more unit zones, wherein to divide the remote space of the remote telerobot into one or more unit zones, the telerobot space mapping module is further configured to divide the remote space of the remote telerobot into one or more unit zones corresponding to the user zone.

16. An apparatus for movement mapping based telepresence interactions, comprising:

a computer processor and a memory in a telerobot;

a command action implementation module coupled to the computer processor;

the command action implementation module configured to implement a command action stream, wherein to implement the command action stream, the command action implementation module is to receive the command action stream from a remote human user and is to implement the command action stream in an attitude and vector of the telerobot;

wherein the command action stream from the human user is to be suspended when a signal indicates that the human user has reached a margin of a user zone; and an immersive feedback sensor module coupled to the computer processor, the immersive feedback sensor module configured to provide an immersive feedback stream to the remote human user, and a telerobot space mapping module coupled to the computer processor, the telerobot space mapping module configured to map a space of the telerobot, wherein to provide the immersive feedback stream to the remote human user, the immersive feedback sensor module is further configured to:

receive the immersive feedback stream from the immersive feedback sensor module;

encode the immersive feedback stream; and transmit the immersive feedback stream to a virtual reality headset of the remote human user;

wherein to map the space of the telerobot the telerobot space mapping module is further configured to:

receive a map of the user zone, divide the space of the telerobot into one or more unit zones corresponding to the user zone; and at least one of:

map the space of the telerobot according to a spatial data received from at least one of the immersive feedback sensor module, the command action implementation module, and a space mapping sensor; or transmit to a computer device of the remote human user an indicator that the telerobot is at a margin of a unit zone of the one or more unit zones, wherein the indicator that the telerobot is at the margin of the unit zone of the one or more unit zones is to suspend the command action stream from the human user.

* * * * *